United States Patent
Izumi

(10) Patent No.: US 8,686,988 B2
(45) Date of Patent: Apr. 1, 2014

(54) METHOD FOR DRIVING ELECTROCHEMICAL DISPLAY ELEMENT

(75) Inventor: Tomoo Izumi, Toyonaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 273 days.

(21) Appl. No.: 13/131,432

(22) PCT Filed: Nov. 10, 2009

(86) PCT No.: PCT/JP2009/069101
§ 371 (c)(1),
(2), (4) Date: May 26, 2011

(87) PCT Pub. No.: WO2010/067681
PCT Pub. Date: Jun. 17, 2010

(65) Prior Publication Data
US 2011/0267334 A1    Nov. 3, 2011

(30) Foreign Application Priority Data

Dec. 8, 2008    (JP) .................................. 2008-311895

(51) Int. Cl.
*G02F 1/153*    (2006.01)

(52) U.S. Cl.
USPC ........................................ 345/212; 359/270

(58) Field of Classification Search
USPC .......................................... 345/212, 105–111
See application file for complete search history.

(56) References Cited

U.S. PATENT DOCUMENTS

| | | | | |
|---|---|---|---|---|
| 7,084,853 B2* | 8/2006 | Shinozaki et al. | ............ | 345/105 |
| 7,312,914 B2* | 12/2007 | Shinozaki et al. | ............ | 359/270 |
| 7,907,323 B2* | 3/2011 | Shimotani et al. | ............ | 359/270 |
| 2006/0038799 A1* | 2/2006 | Tanaka et al. | ................. | 345/204 |
| 2006/0097982 A1* | 5/2006 | Arai et al. | ..................... | 345/105 |
| 2006/0152438 A1* | 7/2006 | Tanaka | ............................ | 345/48 |

FOREIGN PATENT DOCUMENTS

| | | |
|---|---|---|
| CN | 1714382 A | 12/2005 |
| JP | 2004-170850 A | 6/2004 |
| JP | 2007-256505 A | 10/2007 |
| KR | 10-2005-0085084 A | 8/2005 |
| TW | I248047 B | 1/2006 |
| WO | WO 2004/049294 A1 | 6/2004 |
| WO | WO 2007/032117 A1 | 3/2007 |
| WO | WO 2008/102604 A1 | 8/2008 |
| WO | WO 2010/067681 A1 | 6/2010 |

\* cited by examiner

*Primary Examiner* — Claire X Wang
*Assistant Examiner* — Ngan Pham Lu
(74) *Attorney, Agent, or Firm* — Cozen O'Connor

(57) ABSTRACT

In the case of depositing a metal in a plurality of stages by applying deposition voltages having a plurality of rectangular waves at different voltages to an electrochemical display element, the application time of the rectangular wave at the highest voltage among the plurality of rectangular waves is set to a time (Tip) required for reaching a resistance inflexion point (Rip) where the resistance value (R) of a pixel starts to rapidly increase or shorter. Thus, the element can be prevented from being broken without deteriorating the response characteristics of a display element.

10 Claims, 10 Drawing Sheets

METHOD FOR DRIVING ELECTROCHEMICAL DISPLAY ELEMENT

RELATED APPLICATIONS

This application is a U.S. National Stage Application under 35 U.S.C. 371 of International Application No. PCT/JP2009/069101, filed with the Japanese Patent Office on Nov. 10, 2009, which claims priority to Japanese Patent Application No. 2008-311895, filed Dec. 8, 2008.

TECHNICAL FIELD

The present invention relates to a method for driving an electrochemical display element electrolytic solution by applying a deposition voltage between a pixel electrode and a common electrode to deposits metal contained in electrolytic solution, thereby displaying an image.

BACKGROUND ART

In recent years, as a result of the increase in the operation speed of the PC, the popularization of the network infrastructure, and the increased capacity and reduced price of data storage, the chances of viewing documents and images, which used to be provided as printed matters on paper, as electronic information, which is easier.

As a display device for viewing such electrical information, conventional liquid crystal displays and CRTs, or recent light-emitting type displays such as organic EL displays are used. In particular, when the electronic information text is viewed, the display apparatus must be watched for a relatively long period of time. However, generally, the conventional display apparatus has a problem that its flicker causes human eyes to get tired.

A reflection type display using the external light is known as a display apparatus for solving the above-mentioned problem.

As a display method for realizing such reflection type display, there is much attention on the electrochemical display element using an electrodeposition method (hereinafter referred to as "ED method") utilizing dissolution and deposition of metal or metal salt. The ED method has such advantages as a low driving voltage, simple cell structure, and excellent display quality with bright paper-like white and deep black.

The black/white density control in the ED method is performed by controlling the amount of deposited metal. The control is performed by, for example, changing a deposition voltage to be applied, or changing a time period for applying a constant deposition voltage.

For example, the Patent Document 1 discloses a method in which a time period for applying a deposition voltage to a pixel electrode is controlled to conduct a gray scale display and a method in which the deposition voltage is changed into a multi-valued voltage.

RELATED ART DOCUMENT

Patent Document

Patent Document: Japanese Unexamined Patent Application Publication No. 2004-170850

SUMMARY OF THE INVENTION

Problems to be Solved by the Invention

However, the electrochemical display element based on the ED method is characterized in that, when a prescribed voltage is continuously applied, the resistance suddenly increases at a certain point of time. When the increase of resistance causes the voltage applied to the element to exceed the breakdown voltage of the element, the element will break down.

The above-mentioned problem does not arise when driving is performed at such a low voltage that does not exceed the breakdown voltage even if resistance of the electrochemical display increases. However, this measure will increase the blackening time for the metal to be deposited to display black. The response of the display device will be seriously deteriorated.

The Patent Document 1 fails to describe to measures to solve the above-mentioned problem. It shows a driving method in which a voltage is continuously applied to the electrochemical display element even when line is not selected by providing a capacitor for holding the voltage applied to the gate electrode of the pixel drive transistor. This method increases the probability of breakdown of the element by prolonging the voltage application time.

The present invention is intended to solve the aforementioned problems. It is accordingly an object of the invention to provide a method for driving an electrochemical display element, in which method without deteriorating the response of the display device, it is prevented that the voltage applied to the electrochemical display element goes high and exceeds the breakdown voltage to break the element.

Means to Solve the Problems

An object of the present invention is achieved by the following configuration.

Item 1. A method for driving an electrochemical display element which uses an electrochemical display element including: a plurality of pixel electrodes each provided on each of a plurality of pixels arranged in two-dimensional matrix; a common electrode commonly provided on the pixels; and an electrolytic solution layer sandwiched between the pixel electrodes and the common electrode and containing metal ion, and displays an image by applying an deposition voltage across the pixel electrodes and the common electrode so as to deposit or ionize the metal, wherein:

the deposition voltage included a plurality of rectangular wave having different voltages to conduct a plural levels of deposition;

a voltage of a rectangular wave, of the plurality of rectangular waves, who has the highest voltage is a voltage of the rectangular wave having the highest voltage wherein when the voltage of the rectangular wave having the highest voltage is continuously applied, a resistance value of the pixel reaches an inflexion point of resistance, where the resistance of the pixel starts to rapidly increase, and then the electrochemical display element breaks down; and a time period of applying the rectangular wave having the highest voltage is set to equal to or less than a time period to get to the inflexion point when the voltage of the rectangular wave having the highest voltage is continuously applied.

Item 2. The method for driving an electrochemical display element of item 1, wherein multiple tone display is performed by selectively applying the plurality of rectangular waves for plural times.

Item 3. The method for driving an electrochemical display element of item 1 or 2, wherein the plurality of rectangular waves include a high voltage rectangular wave and a low voltage rectangular wave.

Item 4. The method for driving an electrochemical display element of any one of items 1 to 3, wherein the electrochemical display element includes a pixel circuit for applying the deposition voltage between the pixel electrode and the common electrode, and the plurality of rectangular waves are generated by changing a resistance of the pixel circuit.

Item 5. The method for driving an electrochemical display element of item 4, wherein the pixel circuit includes a driving transistor, and the plurality of rectangular waves are generated by changing a channel resistance between a drain and a source of the driving transistor.

Advantages of the Invention

According to the present invention, when depositing a metal in multiple levels by applying deposition voltages having a plurality of rectangular wave having different voltages to an electrochemical display device, the application time of the rectangular wave having the highest voltage of the plurality of rectangular waves is set to a time period required to reach a resistance inflection point where the resistance of a pixel starts to rapidly increase. This arrangement prevents the element from being broken without deteriorating the response of the display device.

BEST MODE FOR CARRYING OUT THE INVENTION

The following describes the present invention with reference to the illustrated embodiments, without the present invention being restricted thereto. In the following description, the same or like parts are designated by the same reference numbers. Duplicated description may be omitted.

Figure 12A:
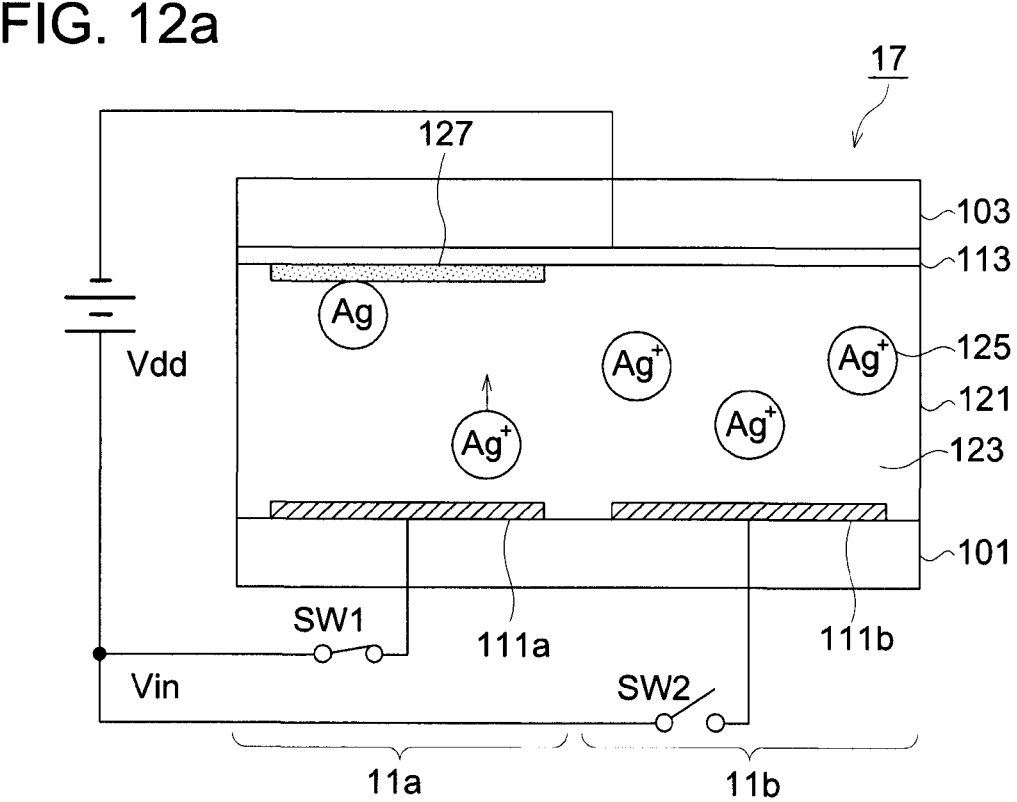
FIGS. 12a and 12b are schematic diagrams for explaining a display principle of an electrochemical display element.
Figure 12B:
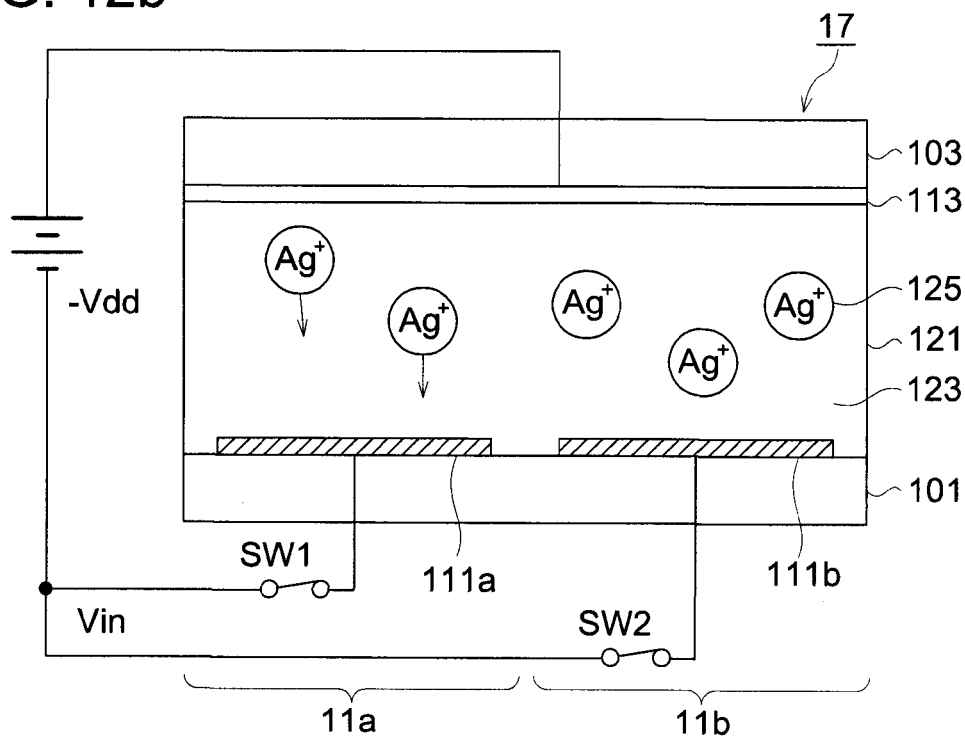

FIGS. 12a and 12b are used to describe the display principle of an electrochemical display element (hereinafter referred to as "ED element") according to an embodiment of the present invention. FIGS. 12a and 12b are schematic diagrams showing the display principle of an ED element.

FIG. 12a shows the case of displaying black, and FIG. 12b shows the case of displaying white.

In FIGS. 12a and 12b, for the sake of clarity, assuming that the ED element 17 is made up of two pixels 11a and 11b. The ED element 17 is structured in such a way that an electrolytic solution layer 121 having silver ion 125 dissolved in an electrolytic solution 123 is sandwiched between pixel electrodes 111a and 111b provided on a drive substrate 101 and a common electrode 113 provided under the common substrate 103.

Observation as a display device is conducted from the side of the common electrode 113, and therefore, a transparent electrode such as an ITO (indium tin oxide) electrode is used as the common electrode 113. Chemically stable metals such as silver are employed as pixel electrodes 111a and 111b.

In FIG. 12a, when a switch SW1 is closed and the positive voltage Vdd equal to or greater than a threshold value is applied to the pixel electrode 111a with respect to the common electrode 113, electrons are injected from the common electrode 113 and a silver layer 127 is deposited at the position, on the common electrode 113, opposed to the pixel electrode 111a. When this is viewed from the side of the common electrode 113 (top of the figure), the portion where the silver layer 127 is deposited appears black. On the other hand, the switch SW2 is turned off, and voltage is thus not applied to the pixel electrode 111b, and there is no deposition of a silver layer 127 on the position opposed thereto.

In FIG. 12b, when negative voltage −Vdd equal to or greater than the threshold value is applied to the pixel electrodes 111a and 111b, with respect to the common electrode 113, the silver layer 127 having been deposited at the position, on the common electrode 113, opposed to the pixel electrode 111a is oxidized and converted into silver ion 125, which is dispersed into the electrolytic solution 123.

This state appears transparent when viewed from the common electrode 113, and therefore, if the electrolytic solution 123 is colored in white or if a diffusion layer is provided on the pixel electrode, this portion appears white to an observer. This arrangement enables switching between black and white displays. If the aforementioned pixels 11a and 11b of the ED element are arranged in a two-dimensional matrix on the chive substrate 101, a two-dimensional array display is configured.

A voltage is applied to the pixels 11a and 11b of the ED element 17 by using the switches SW1 and SW2 in FIGS. 12a and 12b, but in this embodiment, voltage is applied using two TFTs (thin film transistors) as the switch for each pixel. Details will be described later with reference to FIG. 1.

The black/white density control is performed by controlling the amount of deposition of the silver layer 127. This control could be performed by changing the deposition voltage Vdd to be applied, or the application time Tp of application of a constant deposition voltage Vdd.

Figure 7:
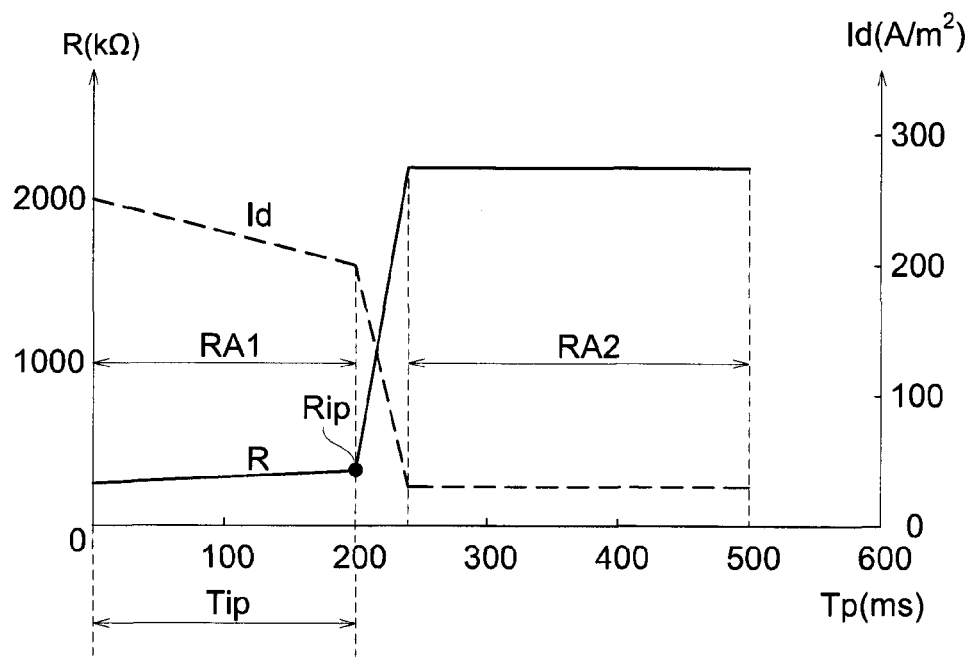
FIG. 7 is a graph showing a current value and resistance value of a pixel in the first example.

However, the ED element is characterized by a phenomenon that the resistance increases at a certain point of time if a prescribed voltage is kept applied. When the increase of the resistance causes the voltage applied to the ED element to exceed the breakdown voltage of the ED element, the ED element will break down. This problem will be explained with reference to FIG. 7. FIG. 7 shows the measurement value of the current density Id per pixel of the ED element in the first example and the resistance value R of each pixel calculated from the current density Id.

In FIG. 7, the horizontal axis indicates the application time Tp for applying a constant voltage Vdd, and the broken line shows the current density Id of the ED element 17 at this time. The solid line represents the resistance value R of the ED element 17 at this time. The current density Id is plotted on the right axis, and the resistance value R is plotted on the left axis.

As shown in the drawing, the current density Id exhibits approximately a constant current density (approximately 220 A/m²) until the lapse of 200 ms after the start of applying the voltage Vdd (region of first reaction RA1), and then it rapidly decreases, and after 240 ms (region of second reaction RA2), there is almost no current flowing, namely, there is no deposition of silver.

Conversely, the resistance value R calculated from the current density Id exhibits a low constant resistance (approximately 300 kΩ) until the lapse of 200 ms from the start of application of voltage Vdd (region of first reaction RA1). After that, it rapidly increases. Then after 240 ms, (region of the second reaction RA2), an almost constant high resistance (approximately 2200 kΩ) is shown. The point wherein a substantial change starts in the resistance value R of the termination of the first reaction RA1 is assumed as a resistance inflection point Rip, and the time from the start of application of the voltage Vdd to the resistance inflection point Rip is assumed as inflection point time Tip.

When the TFT having a great channel resistance such as a-Si (amorphous silicon) and organic TFT is used as the transistor for applying a voltage to the ED element, the resistance of the ED element increases and there is almost no current flow. This reduces the voltage applied across the TFT and increases the voltage applied to the ED element so that it exceeds the breakdown voltage of the ED element. If the voltage applied to the ED element exceeds the breakdown voltage, gas bubbles are generated in the electrolytic solution, and the ED element will be broken.

In the first comparative example to be described later, a voltage of 1.94 volt exceeding the breakdown voltage (1.7 volt) of the ED element is applied to the ED element in the region of second reaction RA2. Thus, after 1000 times of drive, gas bubbles are created in 80 percent of the pixels, and the ED element is broken. This property has the same trends for different materials of electrolytic solution and electrode material.

The aforementioned problem does not occur when driving is performed with a low voltage that does not exceed the breakdown voltage even when the resistance of the ED element increases. In such situation, the blackening time for changing to the black display with silver being deposited is extremely long, and thereby adversely affecting the response as a display device. For example, in the second comparative example to be described later, the blackening time is 5 times as long as that in the first example.

In this embodiment, to solve this problem, a method of applying voltage to the ED element has been improved.

Figure 1:
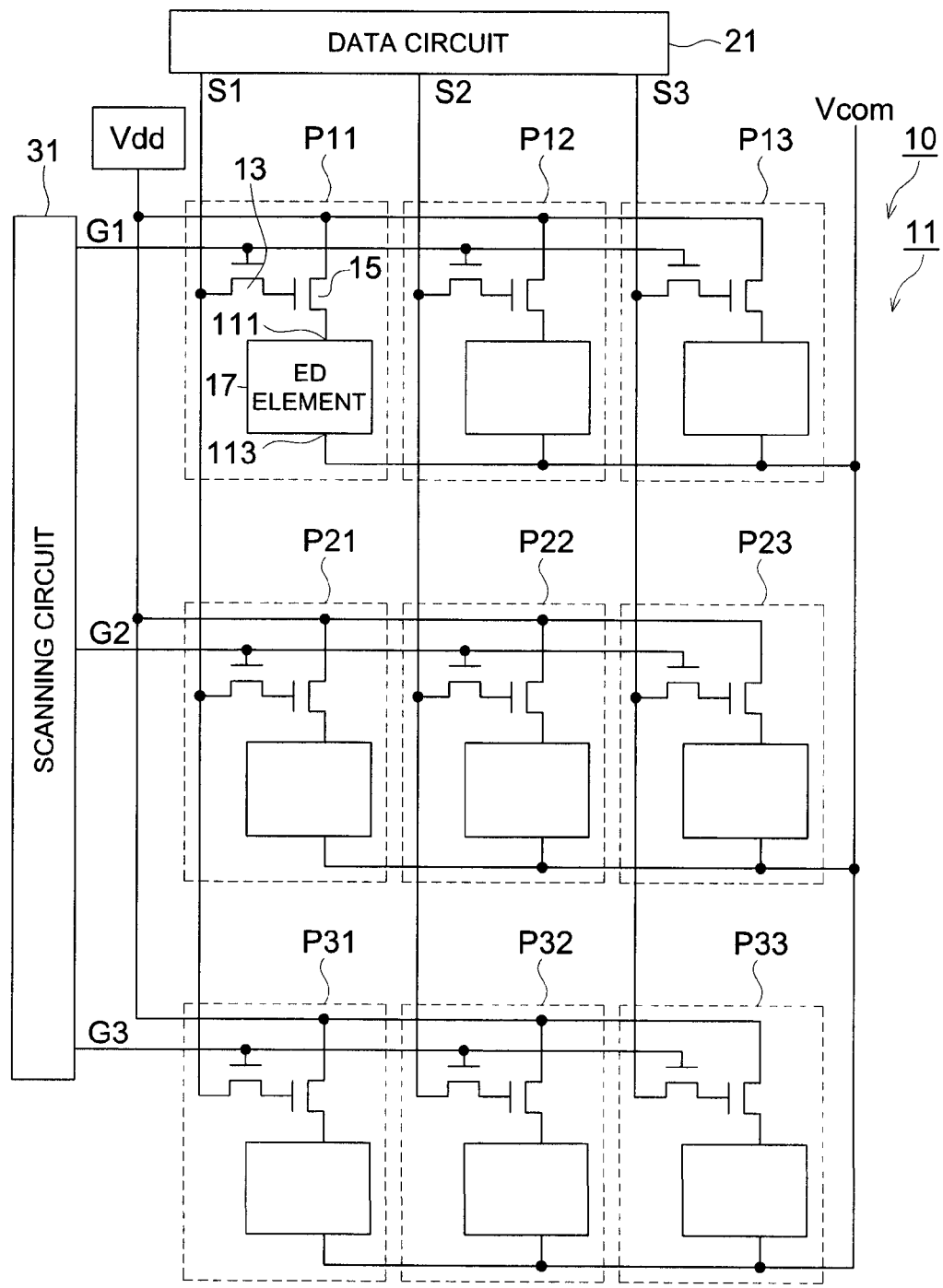
FIG. 1 is a schematic diagram representing a configuration of a display panel in an embodiment of the present invention.

Referring to FIG. 1, the following describes the configuration of the display panel 10 provided with an ED element in the present embodiment. FIG. 1 is a schematic diagram representing the configuration of the display panel 10 of this embodiment. Here assuming that pixels 11 area laterally arranged in is a row, and vertically arrange din a column. The display panel 10 made up of 3 rows×3 column=9 pixels (11) is illustrated as an example, without the present invention being restricted thereto. These numbers of the rows and columns can be changed to any required numbers. Of the nine pixels 11, the pixel on the n-th row and m-th column is referred to as Pnm. For example, the pixel 11 on the first row and first column is P11, and the pixel 11 on the third row and second column is P32.

In FIG. 1, the display panel 10 is made up of the nine pixels 11, a data circuit 21, a scanning circuit 31 and others. The pixel 11 is made up of two TFTs, a selection transistor 13 and a drive transistor 15, and an ED element 17. The two TFTs, the selection transistor 13 and the drive transistor 15, works as a pixel circuit.

The data circuit 21 outputs signals to the signal lines S1, S2 and S3 connected to the source electrodes of the selection transistors 13 for respective columns of the display panel 10. The scanning circuit 31 outputs signals to the scanning lines G1, G2 and G3 connected to the gate electrodes of the selection transistors 13 for respective rows of the display panel 10. The drain electrodes of the selection transistors 13 are connected to the gate electrodes of the drive transistors 15, and the drain transistors 13 perform on/off control of the drive transistors 15.

Any one of the scanning lines G1, G2 and G3 is sequentially selected by the scanning circuit 31. When all the selection transistors 13 on the selected rows are turned on, signals are supplied to the signal line S1 through the signal line S3 by the data circuit 21. By repeating this procedure, the drive transistors 15 are on/off controlled while scanning from the first row to the third row, thereby performing display.

The source electrodes of the drive transistors 15 of all the pixels 11 are connected to a power supply Vdd. The drain electrode of the drive transistor 15 is connected to the pixel electrode 111 of the ED element 17 of each of the pixels 11. The common electrode 113 of the ED element 17 is connected to the common potential Vcom. The power supply Vdd is capable of changing the output thereof.

When the voltage between the common power supply Vdd and the common potential Vcom is selectively applied to the ED elements 17 of respective pixels 11, a white display or black display is shown on the ED elements 17 of respective pixels 11. This two-transistor system is called an active matrix system and is generally employed in the organic EL display apparatus and others.

Figure 2A:
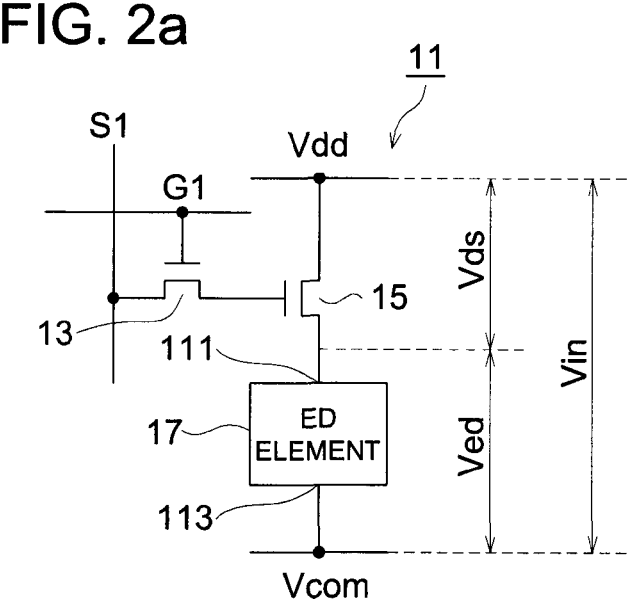
FIGS. 2a and 2b are schematic diagrams representing a configuration of a display panel pixel in the embodiment of the present invention.
Figure 2B:
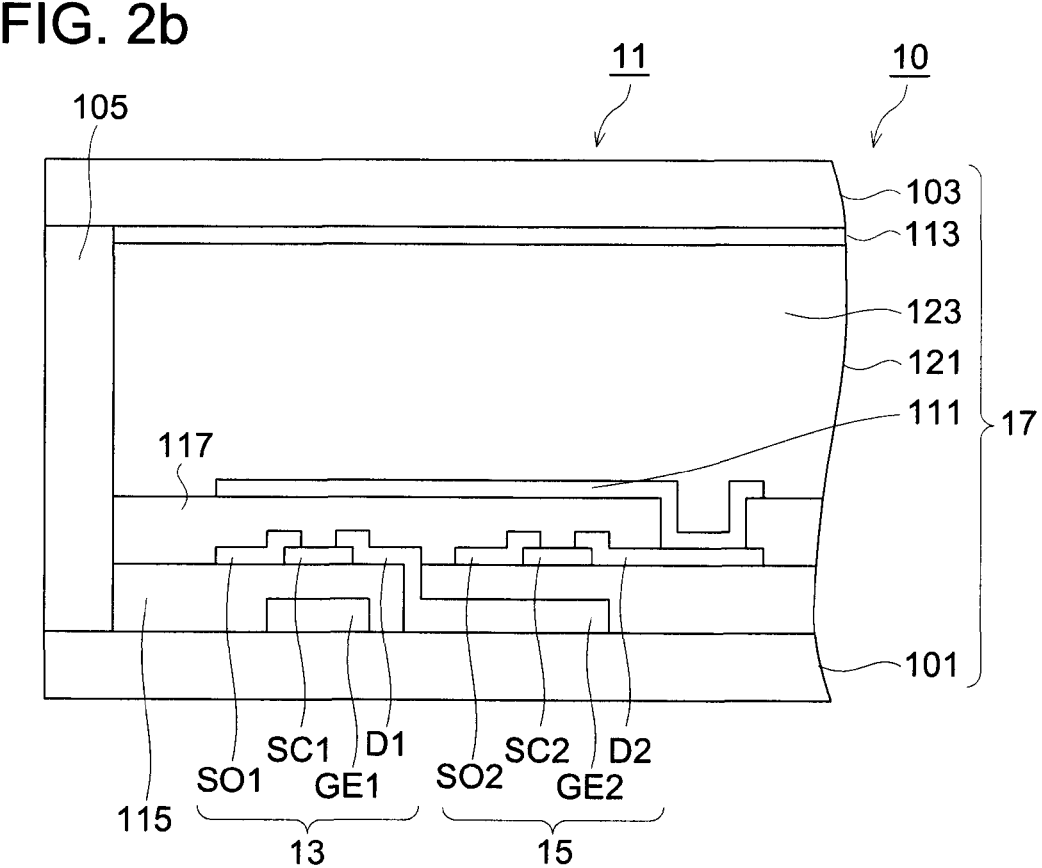

Referring to FIGS. 2a and 2b, the following describes the structure of the aforementioned pixels 11. FIG. 2 is a schematic diagram explaining the structure of the pixels 11 of the display panel 10 of the present embodiment. FIG. 2a is a circuit diagram showing the structure of the pixel 11, and FIG. 2b is a cross sectional view showing the structure of the pixel 11.

In FIG. 2a, the circuit diagram of the pixel 11 is the same as that of FIG. 1. Assuming that the voltage applied between the common power supply Vdd and the common potential Vcom is Vin, the voltage between the drain and source of the drive transistor 15 is Vds, and the voltage between the pixel electrode 111 and common electrode 113 is Ved.

In FIG. 2b, the pixel 11 is made up of the selection transistor 13, the drive transistor 15, the ED element 17 and others. In the first place, the TFT is arranged in such a way that the gate electrodes GE1 and GE2 are formed on the drive substrate 101 and a gate insulation layer 115, semiconductor layers SC1 and SC2, drain electrodes D1 and D2 and source electrodes SO1 and SO2 are formed in this order on the gate electrodes GE1 and GE2. The drain electrode D1 and gate electrode GE2 are connected through a through-hole provided in the gate insulation layer 115.

On the other hand, the ED element 17 is configured in such a way that the electrolytic solution layer 121 in which silver ion 125, for example, is dissolved in the electrolytic solution 123 is sandwiched between the pixel electrode 111 provided, for each pixel 11, on the flattening film 117 formed on the TFT formed on the drive substrate 101, and the common electrode 113 continuously formed, under the common substrate 103, common for the all the pixels.

The pixel electrode 111 and the drain electrode D2 of the drive transistor 15 are connected through the through-hole provided in the flattening film 117. At the end of the display panel 10, the drive substrate 101 and the common substrate 103 are connected and sealed with a seal pattern 105.

Embodiment 1

Figure 3A:
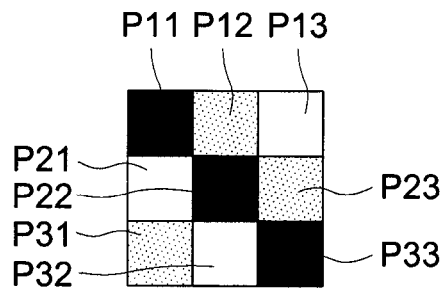
FIGS. 3a and 3b are schematic diagrams representing a first embodiment of a method for driving the display panel.
Figure 3B:
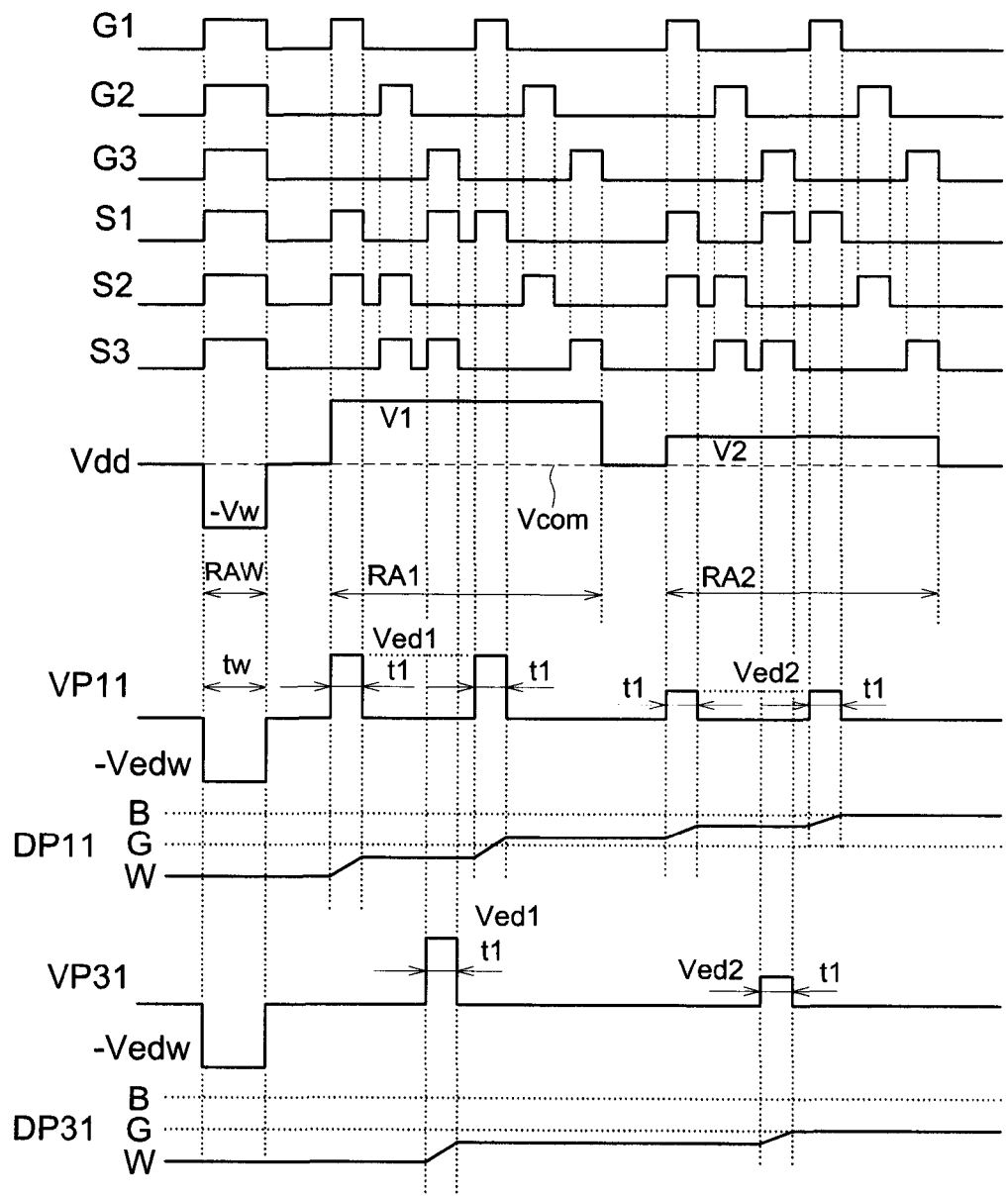

Referring to FIGS. 3a and 3b, the following describes a first embodiment of the method for driving the display panel 10 according to the present invention. FIGS. 3a and 3b are schematic diagrams representing the first embodiment of the method for driving a display panel. FIG. 3a is a diagram showing a display example, and FIG. 3b is a time chart showing the signal s and the voltage of various portions.

In FIG. 3a, the following describes three-value display black, gay and white, by way of examples. For one example, assume that pixels P11, P22 and P33 are made to display black, pixels P12, P23 and P31 to display gray, and pixels P13, P21 and P32 to display white.

In FIG. 3b, in the first place, initialization is performed to change all the pixels to display white W. The voltage from the power supply Vdd is set to negative −Vw with respect to the common potential Vcom, and all of the scanning lines G1, G2 and G3 and signal lines S1, S2 and S3 are turned on (set to high-level). FIG. 3h illustrates the voltages VP11 and VP31 applied to the ED element 17 of the pixels P11 and P31.

Thus, a negative voltage −Vedw with respect to the common electrode 113 is applied to the pixel electrode 111 of the ED element 17 of all the pixels. Even if the silver layer 127 is deposited on the side of the common electrode 113, the silver layer 127 is oxidized to be silver ion 125, and is dispersed in the electrolytic solution 123. This turns all the pixels into the state of white W. This is assumed as a whitening reaction RAW. FIG. 3b illustrates the densities DP11 and DP31 of the pixels P11 and P12. The voltage −Vw and application time tw thereof should be determined as appropriate in such a way that the pixel displaying black is made to display white W.

The following describes the method of displaying black B or gray G: The voltage from the power supply Vdd is set to positive V1 with respect to the common potential Vcom, and the scanning line G1 is turned on. This procedure turns on the selection transistors 13 of the pixels P11, P12 and P13. In this state, the signal lines S1 and S2 are turned on, whereby the drive transistors 15 of the pixels P11 and P12 are turned on.

Then the positive voltage Ved1 with respect to common electrode 113 is applied to the pixel electrodes 111 of the ED elements 17 of the pixels P11 and P12. The silver ion 125 in the electrolytic solution 123 is reduced and the silver layer 127 is deposited on the side of the common electrode 113. After the lapse of a prescribed time t1, the scanning line G1 is turned off to suspend the deposition of the silver layer 127 in the ED element 17 of the pixels P11 and 12.

Then the signal lines S2 and S3 are turned on with the scanning line G2 turned on, and the positive voltage Ved1 is applied to the ED element 17 of the pixels P22 and P23, with the result that the silver layer 127 is deposited. After the lapse of prescribed time t1, the scanning line G2 is turned off to suspend the deposition of the silver layer 127 on the ED element 17 of the pixels P22 and P23.

Then the signal lines S1 and S3 are turned on with the scanning line G3 turned on, and the positive voltage Ved1 is applied to the ED elements 17 of pixels P31 and P33, with the result that the silver layer 127 is deposited. After the lapse of prescribed time t1, the scanning line G3 is turned off to suspend the deposition of the silver layer 127 on the ED element 17 of the pixels P31 and P33.

In a similar manner, a cycle in which the scanning lines G1, G2 and G3 are sequentially turned on is performed again. In this case, only the signal lines connected to the pixels P11, P22 and P33 which display black B are turned on.

Next, the voltage of the power supply Vdd is returned to the same voltage as the common potential Vcom, and then the power supply Vdd is set to positive voltage V2 with respect to the common potential Vcom. The voltage V2 is lower than the voltage V1. In this state, the cycle in which the scanning lines G1, G2 and G3 are sequentially turned on are performed twice.

The signal lines to be turned on in the first cycle are those for only the pixels P11, P22 and P33 that is to display black B and the pixels P12, P23 and P31 that is to display gray B that. The signal lines to be turned on in the second cycle are those for only in the pixels P11, P22 and P33 that display black B.

To take the pixel P11 for black B as an example, the scanning line G1 is turned on four times, and the ED element 17 is supplied with the voltage Ved1 twice and with the voltage Ved2 twice. In the ED element 17 of the pixel P11, the silver layer 127 is deposited by these four applications of voltage, and the initially displayed white W is changed to black B. The same operation is also performed for the pixels P22 and P33 for displaying black B.

To take the pixel P31 for gray display Gas an example, the scanning line G3 is turned on four times, and the ED element 17 is supplied with the voltage Ved1 once and with the voltage Ved2 once. In the ED element 17 of the pixel P13, the silver layer 127 is deposited by these two applications of voltage, and the initially displayed white W is changed to gray G. The same operation is also performed for the pixels P12 and P23 for displaying gray G.

In the above example, in order to display gray G, the ED element 17 is supplied with the voltage Ved1 once and with the voltage Ved2 once. However, to display a more light gray, there may be combined other method as follows to increase the number of tones of display: a method in which the voltage Ved1 is applied once but the voltage Ved2 is not applied; and the voltage Ved2 is applied, but the voltage Ved1 is not applied.

To take the pixel P21 for displaying white W as an example, the scanning line G2 is turned on four times while the signal line S1 is kept off. Thus, the silver layer 127 is not deposited in the ED element 17 of the pixel P21. The initially displayed white W remains unchanged. The same operation is also performed for the pixels P13 and P32 for displaying white W.

Here, the voltage V1 is set in such a way that the ED element 17 will break down when the voltage V1 is continuously applied from the power supply Vdd so as to apply the voltage Ved1 to the ED element 17 and the resistance value R of the ED element 17 has then exceeded the resistance inflection point Rip (FIG. 7a) to reach a high resistance.

The voltage V2 is set in such a way that the ED element 17 will not break down even when the voltage V2 is continuously applied from the power supply Vdd so as to apply the voltage Ved2 to the ED element 17, and the resistance value R of the ED element 17 has then exceeded the resistance inflection point Rip to reach a high resistance.

The predetermined time period t1 is set to the time equal to or shorter than half the inflection point time Tip to reach the resistance inflection point Rip at which the resistance value R of the ED element 17 starts to drastically change in the case where the voltage V1 is applied from the power supply Vdd.

When the predetermined time period t1 has been set as discussed above, the total voltage application time period is 2×t1 Tip even for the pixels P11, P22, and P33 for displaying black B in which the ED elements 17 are supplied with the voltage twice from the power supply Vdd while the voltage is V1. Thus, the resistance value R of the ED element 17 remains low, and the ED elements 17 will not break down.

In the aforementioned first embodiment, in order to display one image, two cycles of operation are assumed to be performed when the voltage from the power supply Vdd is V1, and two cycles are also assumed to be performed when the voltage from the power supply Vdd is V2. The present invention, however, is not restricted thereto. If the predetermined time period t1 is set to a shorter time, the number of cycles may be increased. This measure can be used to display in a greater number of tones. For example, if the number of cycles is "n" (wherein "n" indicates a positive integer), a maximum tones of "n+1" are available. Even in this case, however, the predetermined time period t1 must meet the requirement of "n×t1≤Tip".

As discussed above, the first embodiment of the present invention provides a method for driving an electrochemical display element, in which method when the application of voltages V1 and V2 from the power supply Vdd is applied to deposit a metal by applying deposition voltages having a plurality of two different rectangular waves at different voltages—voltages Ved1 and Ved2—to the electrochemical display element, the total application time of the rectangular wave at the high voltage Ved1 is set to the time equal to or shorter than the time period required for reaching a resistance inflection point where the resistance of a pixel starts to rapidly increase by the continued application of the voltage V1. This arrangement prevents the element from breaking down by the breakdown voltage being exceeded by the voltage applied to the ED element, without deteriorating the response of a display device.

Embodiment 2

Figure 4A:
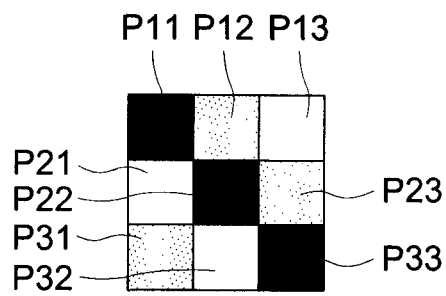
FIGS. 4a and 4b are schematic diagrams representing a second embodiment of the method for driving the display panel.
Figure 4B:
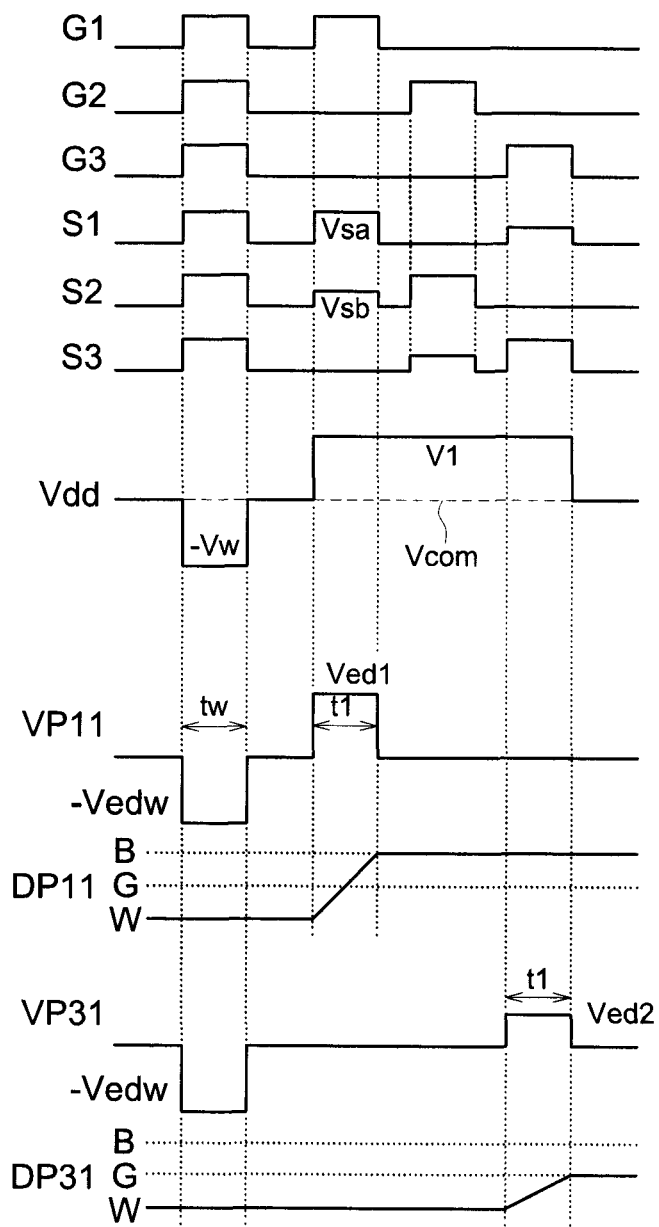

Referring to FIGS. 4a and 4b, the following describes a second embodiment of the method for driving the display panel 10 of the present invention. FIGS. 4a and 4b are schematic diagrams representing the second embodiment of the method for driving the display panel 10. FIG. 4a shows a display example, and FIG. 4b is a time chart illustrating the signals and the voltages of various portions.

The display example of FIG. 4a is the same as that of FIG. 3a.

In FIG. 4b, in the first place, initialization is executed to change all pixels to display white. The operation of the initialization is the same as that in FIG. 3b.

The following describes the method for displaying black B or gray G: The on-resistance between the drain and the source (channel resistance value) of the TFT can be changed in an analog manner by controlling the gate voltage. In particular, in the case of the N-channel TFT, the channel resistance is decreased by increasing the gate voltage, and the channel resistance is increased by decreasing the gate voltage. In the second embodiment, this measure is used for three-value display.

The voltage from the power supply Vdd is set to a positive voltage V1 with respect to the common potential Vcom, and the scanning line G1 is turned on to turn on the selection transistors 13 of the pixels P11, P12 and P13. In this state, the signal line S1 is set to a high voltage Vsa, and the signal line S2 is set to a low voltage Vsb. Thus, the drive transistor 15 of the pixel P11 is turned on with a low resistance value and the drive transistor 15 of the pixel P12 is turned on with a high resistance value.

In this state, the positive high voltage Ved1 with respect to the common electrode 113 is applied to the pixel electrode 111 of the ED element 17 of the pixel P11, and the positive low voltage Ved2 with respect to the common electrode 113 is applied to the pixel electrode 111 of the ED element 17 of the pixel P11. Depending on the high/low state of the voltage, the silver ion 125 in the electrolytic solution 123 is reduced. Thus, a thick silver layer 127 is deposited on the side of the common electrode 113 of the pixel P11, and a thin silver layer 127 is deposited on the side of the common electrode 113 of the pixel P12. After the lapse of a predetermined time period t1, the scanning line G1 is turned off so that deposition of the silver layers 127 in the ED elements 17 of the pixels P11 and P12 is suspended.

In the next step, while the scanning line G2 is on, the signal line S2 is set to a high voltage Vsa and the signal line S3 is set to a low voltage Vsb. In this state, the high voltage Ved1 is applied to the ED element 17 of the pixel P22 so that a thick silver layer 127 is deposited, and the low voltage Ved2 is applied to the ED element 17 of the pixel P23 so that a thin silver layer 127 is deposited. After the lapse of a predetermined time period t1, the scanning line G2 is turned off to suspend the deposition of the silver layers 127 in the ED element 17 of the pixels P22 and P23.

Next, while the scanning line G3 is on, the signal line S1 is set to a low voltage Vsb and the signal line S3 is set to a high voltage Vsa, In this state, the low voltage Ved2 is applied to the ED element 17 of the pixel P31 so that a thin silver layer 127 is deposited, and the high voltage Ved1 is applied to the ED element 17 of the pixel P33 so that a thick silver layer 127 is deposited. After the lapse of a predetermined time period t1, the scanning line G3 is turned off to suspend the deposition of the silver layers 127 in the ED elements 17 of the pixels P31 and P33.

To take the pixel P11 for displaying black B, the signal line S1 is set to a high voltage Vsa in the time period when the scanning line G1 is on, and the high voltage Ved1 is thus applied to the ED element 17 of the pixel P11 so that thick silver layer 127 is deposited, and the initially displayed white W is changed to black B. The pixels P22 and P23 for displaying black B are also subjected to the similar process.

On the other hand, to take the pixel P31 for displaying gray G as an example, the signal line S1 is set to a low high voltage Vsa in the time period when the scanning line G3 is on, and the low voltage Ved2 is thus applied to the ED element 17 of the pixel P31 so that thin silver layer 127 is deposited, and the initially displayed white W is changed to gray G. The pixels P12 and P23 for gray display G are also subjected to the similar process.

To take the pixel P21 for displaying white W as an example, the signal line S1 is turned off in the time period when the scanning line G2 is on, and a voltage is not applied to the ED element 17 of the pixel P21 and a silver layer 127 is not deposited. Thus, the initially displayed white W remains unchanged. The pixels P13 and P32 for white display W are also subjected to the similar process.

The voltage Vsa is set to such a value that the ED element 17 will break down if the voltage Ved1, which is applied to the ED element 17 when the Voltage Vsa is applied to the gate electrode of the drive transistor 15 at the state where the voltage from the power source Vdd is V1, is continuously applied to the ED element 17, and resistance R of the ED element 17 exceeds the resistance inflection point Rip to be a high resistance.

Further, the voltage Vsb is set to such a value that the ED element 17 will not break down even if the voltage Ved2, which is applied to the ED element 17 when the Voltage Vsb is applied to the gate electrode of the drive transistor 15 at the state where the voltage from the power source Vdd is V1, is continuously applied to the ED element 17, and resistance R of the ED element 17 exceeds the resistance inflection point Rip to be a high resistance.

The predetermined time period t1 is set to the time equal to or shorter than the inflection point time Tip to reach the resistance inflection point Rip where the resistance value R of the ED element 17 starts to drastically change when the voltage Ved1 is applied to the ED element 17.

Since the predetermined time period t1 is set as described above, the high voltage Ved1 is applied to the pixels P11, P22, and P33 for displaying black B for the time period t1, which satisfies t1≤Tip. Therefore, the resistance value R of the ED element 17 is kept low. Thus, the ED element 17 is prevented from breaking down.

In the aforementioned second embodiment, the gate voltage is controlled in two values of high voltage Vsa and low voltage Vsb when the voltage from the power supply Vdd is V1 and the drive transistor 15 is on. However, the present invention is not restricted thereto. It is also possible to arrange such a configuration as to permit display a greater number of tones by dividing more finely the control value of the gate voltage in the on-state. For example, if the control levels of the gate voltage in the on-state are made to be n levels (wherein "n" is a positive integer), display can be given in a maximum of (n+1) tone display instead of the aforementioned three value display of white, gay and black.

As described above, the second embodiment of the present invention provides a method for driving electrochemical display element, in which method the gate voltage when the drive transistor of the pixel is on is controlled by two values of high voltage Vsa and low voltage Vsb, thus, when depositing a metal by applying a deposition voltage having different rectangular waves at different high and low voltages to an ED element, the total application time of the rectangular wave at a high voltage is set to the time equal to or shorter than the time period required for reaching the resistance inflection point where the resistance of a pixel starts to rapidly increase due to the continued application of this voltage. This arrangement prevents that the voltage applied to the ED element exceeds the breakdown voltage and the element breaks down, without adversely affecting the response of the display device.

Embodiment 3

Figure 5A:
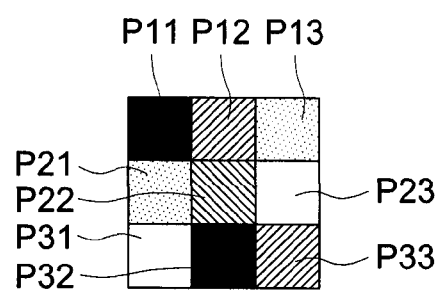
FIGS. 5a and 5b are schematic diagrams representing a third embodiment of the method for driving a display panel.
Figure 5B:
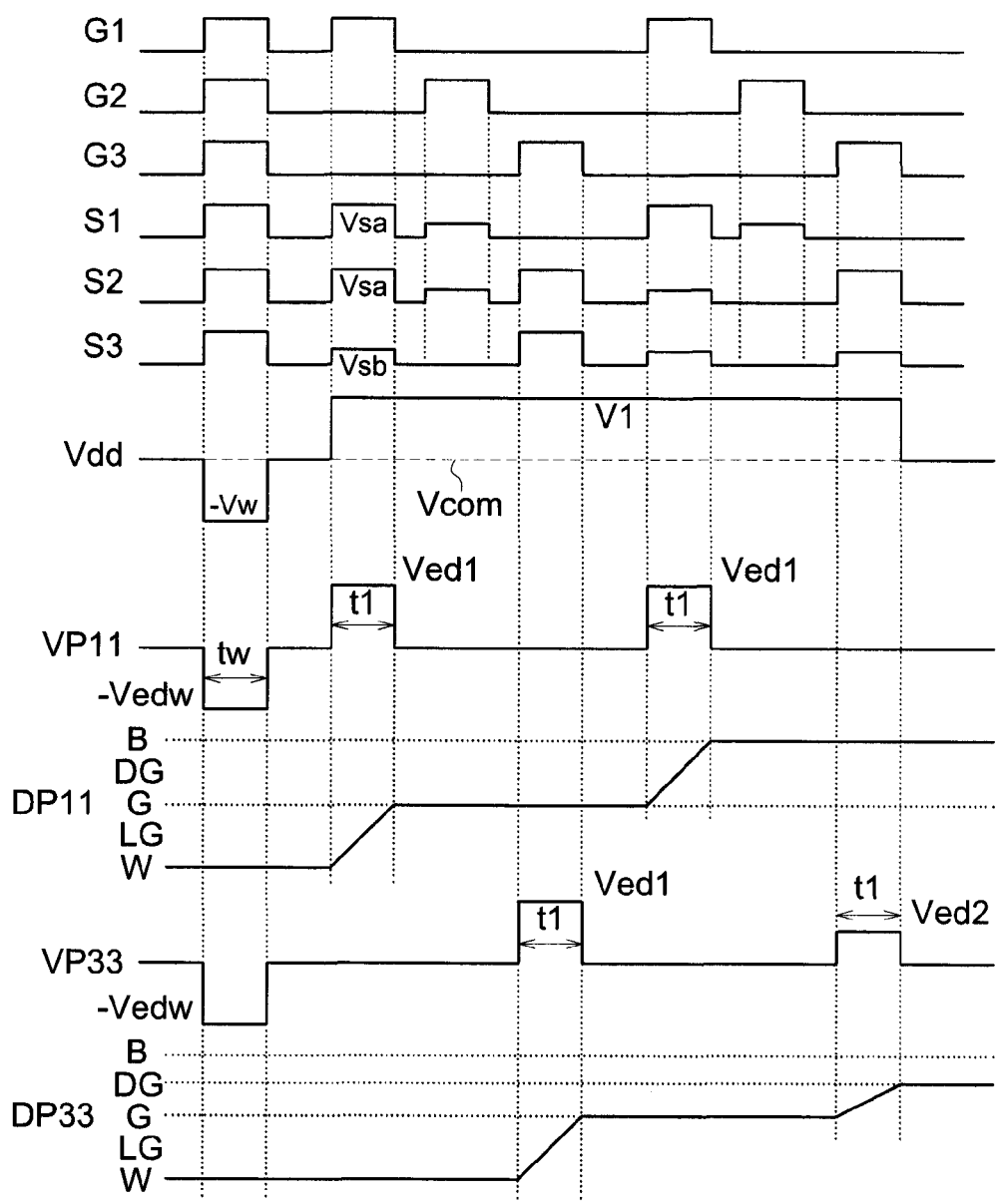

Referring to FIGS. 5a and 5b, the following describes a third embodiment of the method for driving the display panel 10 of the present invention. FIGS. 5a and 5b are schematic diagrams representing the third embodiment of the method for driving a display panel 10. FIG. 5a shows a display example, and FIG. 5b is a time chart illustrating the signals and the voltages of various portions. In the third embodiment, a five-value display can be realized with a combination of the first and second embodiments.

In FIG. 5a, as an example, assume that five-value display will be performed. Namely, the pixels P11 and P32 are used for displaying black B; the pixels P12 and P33 for displaying dark gray DG; the pixels P13 and P21 for displaying gray G; the pixel P22 for displaying light gray LG; and the pixels P23 and P31 for displaying white W.

In FIG. 5b, in the fast place, initialization is performed in such a way that all pixels are made to display white. The operation of the initialization is the same as shown in FIGS. 3b and 4b.

The following describes the method for displaying black B to light gray LG: The voltage from the power supply Vdd is set to a positive voltage V1 with respect to the common potential Vcom so as to turn on the scanning line G1, whereby the selection transistors 13 of the pixels P11, P12 and P13 on the first row are turned on.

In this state, the signal lines S1 and S2 are set to a high voltage Vsa, and the signal line S3 is set to a low voltage Vsb. Then, the drive transistors 15 of the pixels P11 and P12 are turned on with a low resistance value, while the drive transistor 15 of the pixel P13 is turned on with a high resistance value.

Thus, the pixel electrodes 111 of the ED elements 17 of the pixels P11 and P12 are supplied with the positive high voltage Ved1 with respect to the common electrode 113, and the pixel electrode 111 of the ED element 17 of the pixel P13 is supplied with the positive low voltage Ved2 with respect to the common electrode 113.

Depending on the high/low state of the applied voltage, the silver ion 125 in the electrolytic solution 123 is reduced, and a thick silver layer 127 is deposited on the side of the common electrode 113 of the pixels P11 and P12, and a thin silver layer 127 is deposited on the side of the common electrode 113 of the pixel P13. After the lapse of a predetermined time period t1, the scanning line G1 is turned off so that the deposition of the silver layer 127 in the ED element 17 of the pixels P11 and P12 is suspended.

Subsequently while the scanning line G2 is on, the signal lines S1 and S2 are set to a low voltage Vsb. Thus, the ED element 17 of the pixels P21 and P22 are supplied with the low voltage Ved2, whereby a thin silver layer 127 is deposited. After the lapse of a predetermined time period t1, the scanning line G2 is turned off to suspend the deposition of the silver layer 127 in the ED elements 17 of the pixels P21 and P22.

In the next step, while the scanning line G3 is on, the signal lines S2 and S3 are set to a high voltage Vsa. Thus, the ED element 17 of the pixels P32 and P33 are supplied with the high 27 is deposited. After the lapse of a predetermined time period t1, the scanning line G3 is turned off to suspend the deposition of the silver layer 127 in the ED elements 17 of the pixels P32 and P33.

Then, the cycle in which the aforementioned scanning lines G1, G2 and G3 are sequentially turned on is performed again. In this case, when the scanning line G1 is turned on, the signal line S1 is set to a high voltage Vsa, whereby the high voltage Ved1 is applied to the ED element 17 of the pixels P11, and the signal lines S2 and S3 are set to a low voltage Vsb, whereby the low voltage Ved2 is applied to the ED elements 17 of the pixels P12 and P13.

Similarly, when the scanning line G2 is on, only the signal line S1 is set to a low voltage Vsa, and the low voltage Ved2 is applied to the ED element 17 of the pixels P21. When the scanning line G3 is on, the signal line S2 is set to a high voltage Vsa, and a high voltage Ved1 is applied to the ED element 17 of the pixel P32. The signal line S3 is set to a low voltage Vsb, and a low voltage Ved2 is applied to the ED element 17 of the pixel P33.

To take the pixel P11 for displaying black B as an example, for two time periods when the scanning line G1 is on, the signal line S1 is set to a high voltage Vsa, and a high voltage Ved1 is applied to the ED element 17 twice so that a thick silver layer 127 is deposited twice one on top of the other. This changes the initially displayed white W to black B. The pixel P32 for displaying black B is subjected to the similar process.

To take the pixel P33 for displaying dark gray DG as an example, in each of two time periods when the scanning line G3 is on, the signal line S3 is once set to a high voltage Vsa, and a high voltage Ved1 is applied to the ED element 17, and the signal line S3 is once set to a low voltage Vsb, and a low voltage Ved2 is applied to the ED element 17. Thus, a thick silver layer 127 and a thin silver layer 127 are deposited in the ED element 17 of the pixel P33 one on top of the other. This changes the initially displayed white W to dark gray DG. The pixel P12 for displaying dark gray is subjected to the similar process.

Although not shown in FIG. 5b, in the pixel P21 for displaying gray G, the signal line S2 is set to a low voltage Vsb for two time periods when scanning line G2 is on. Thus, a low voltage Ved2 is applied twice to the ED element 17 of the pixel P22 so that a thin silver layer 127 is deposited twice one on top of the other. This changes the initially displayed white W to gray G. The pixel P13 for displaying gray G is subjected to the similar process.

Although not shown in FIG. 5b, in the pixel P22 for displaying light gray LG, the signal line S2 is set to a low voltage Vsb in one of the two time periods when scanning line G2 is on. Thus, a low voltage Ved2 is applied only once to the ED element 17 of the pixel P22 so that a thin silver layer 127 is deposited. This changes the initially displayed white W to light gray LG.

To take the pixel P23 for displaying white W, in all the two time periods when the scanning line G2 is on, the signal line S3 is off; whereby no voltage is applied to the ED element 17 and no the silver layer 127 is deposited. Accordingly; the initially displayed white W remains unchanged. The pixel P31 for displaying white W is subjected to the similar process.

The voltage Vsa is set to such a value that the ED element 17 will break down if the voltage Ved1, which is applied to the ED element 17 when the Voltage Vsa is applied to the gate electrode of the drive transistor 15 at the state where the voltage from the power source Vdd is V1, is continuously applied to the ED element 17, and resistance R of the ED element 17 exceeds the resistance inflection point Rip to be a high resistance.

Further, the voltage Vsb is set to such a value that the ED element 17 will not break down even if the voltage Ved2, which is applied to the ED element 17 when the Voltage Vsb is applied to the gate electrode of the drive transistor 15 at the state where the voltage from the power source Vdd is V1, is continuously applied to the ED element 17, and resistance R of the ED element 17 exceeds the resistance inflection point Rip to be a high resistance.

The predetermined time period t1 of the embodiment is set to the time equal to or shorter than the inflection point time Tip to reach the resistance inflection point Rip where the resistance value R of the ED element 17 starts to drastically change when the voltage Ved1 is applied to the ED element 17.

Since the predetermined time period t1 is set as discussed above, the high voltage Ved1 is applied, through the above-mentioned 2 cycle operation, to the pixels P11 and P32 for displaying black B for a time period of 2×t1 altogether, which t1 satisfies 2×t1≤Tip. Thus, the resistance value R of the ED element 17 remains low, and the ED element 17 will not break down.

In the aforementioned third embodiment, two cycles of operation is performed. However, the present invention is not restricted thereto. The predetermined time period t1 can be reduced to increase the number of cycles so as to realize to display in a greater number of tones.

Further, the gate voltage of the drive transistors 15 can be more finely controlled instead of binary value and the cycle number can be increased as described above and can be combined, and a display of more tones can be realized.

As described above, the third embodiment of the present invention provide a method for driving an ED element. In the method, the cycle in which the gates of the drive transistors of the pixels are controlled, during an on-state of the transistors, with a binary voltage of the high voltage Vsa and the low voltage Vsb is performed twice; thus, the deposition voltage containing the high voltage Ved1 and the low voltage Ved2, which are rectangular waves having different voltages, are applied to the ED elements to deposit metal; and the total time period of the high voltage Ved1 is set equal to or less than the time period to reach the resistance flexion point where the resistance of the pixel starts to rapidly increase due to a continuous application of the high voltage Ved1. With this method, it is prevented, without lowering the response as a display device, that the voltage applied to the ED element increases to exceed the breakdown voltage, thereby breaking down the element.

As described above, the first through third embodiments provide a method for driving an ED element in which when depositing a metal by applying a deposition voltage having a plurality of different rectangular waves having different high voltages to an ED element, the application time period of the rectangular wave having the highest voltage among the plurality of rectangular waves is set to be equal to or shorter than the time period required to reach the resistance inflection point where the resistance of a pixel starts to rapidly increase due to continuous application of the rectangular wave. This arrangement prevents, without lowering the response as a display device, that the voltage applied to the ED element increases to exceed the breakdown voltage and the ED element breaks down.

It is to be expressly understood that the detailed construction and operation of each component constituting the method of the present invention for driving the ED element can be arbitrarily modified, without departing from the spirit of the present invention.

EXAMPLES

The following describes the detailed examples using the aforementioned embodiments, without the prevent invention being restricted thereto. In the following examples, the characteristics of material evaluated first without using any TFT. After that, a display panel was evaluated by using TFTs.

Figure 6A:
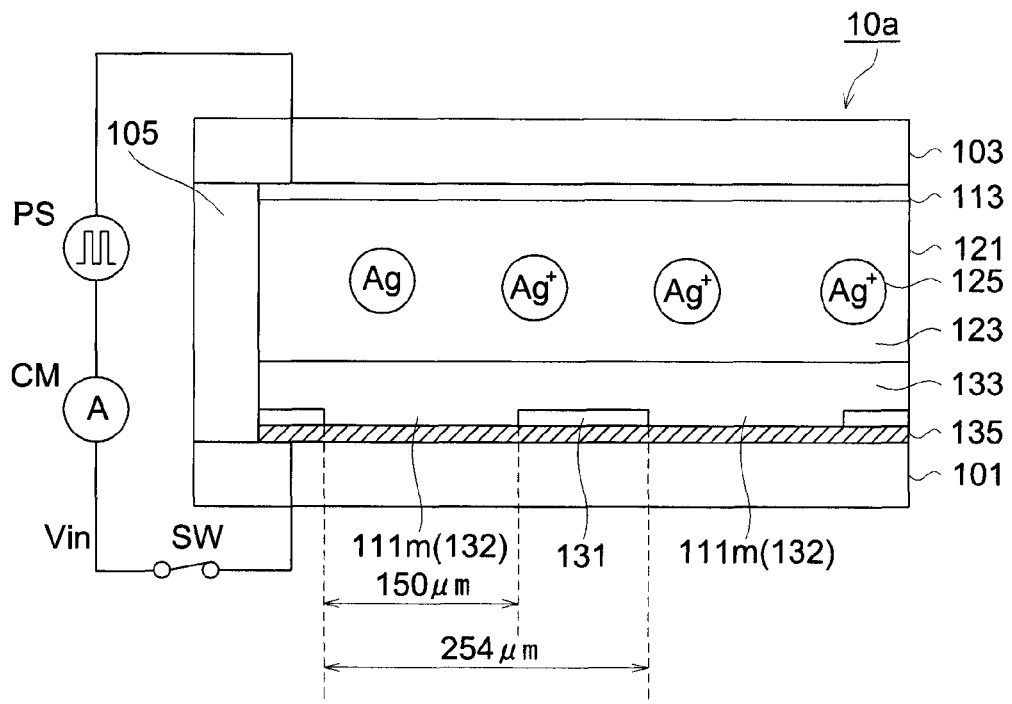
FIGS. 6a and 6b are schematic diagrams representing a cross sections of a material-characteristics evaluation panel and a drive waveform in a first example.

When a TFT was not used, as shown in FIG. 6a, an insulating film 131 was formed on the whole surface on a full-surface electrode 135 formed on the entire of the region for pixels to be provided, and an opening 132 was formed in the insulating film 131 in a two-dimensional matrix, whereby a plurality of simulated pixel electrodes 111m were formed.

Example 1

Figure 6B:
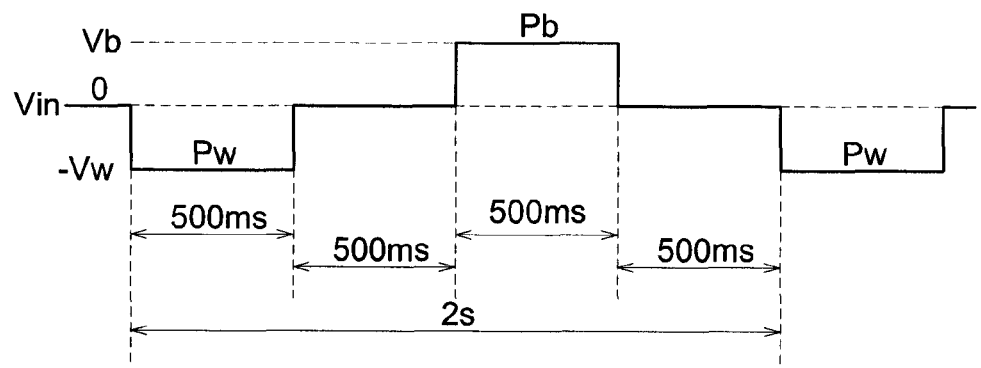

First, referring to FIGS. 6a and 6b, the following describes the production and evaluation of the material-characteristics evaluation panel of the Example 1. FIGS. 6a and 6b are schematic diagrams representing the cross section of a material-characteristics evaluation panel 10a of the first example. FIG. 6a shows a structure of the material-characteristics evaluation panel 10a, and FIG. 6b shows a drive waveform for the evaluation of the material-characteristics evaluation panel 10a.

(Production of Electrolytic Solution 123)

Sodium iodide 90 mg and of silver iodide 75 mg were added to 2.5 g of dimethyl sulfooxide and were dissolved completely. After that, 150 mg of polyvinyl pyrrolidone (average molecular weight; 15,000) was added. This solution was agitated for 1 hour while being heated to 120° C., whereby the electrolytic solution 123 including silver iron 125 was obtained.

(Production of Common Electrode 113)

A transparent conductive ITO film was formed, to produce a common electrode 113, in the thickness of 200 nm on the whole surface of the region, on a glass substrate 103, for pixels to be provided by using a sputtering method.

(Production of Full-Surface Electrode 135)

Gold was used as a full-surface electrode 135 constituting the simulated pixel electrode 111m. First, chromium for improving the adhesiveness between gold and glass was formed on the entire surface of the region, for the pixels to be provided, on the glass drive substrate 101, by using a sputtering method. Gold film was formed, to produce a full-surface electrode 135, in a thickness of 100 nm entirely thereon by using a sputtering method.

(Production of Insulating Film 131 and Simulated Pixel Electrodes 111m)

The PC403 made by JSR, a coating type light sensitive insulating material, was used for an insulating film 131. The PC403 film was formed in a thickness of 2 μm on the full-surface electrode 135 by using a spin coater method at a speed of 1000 rpm. This was subjected to a patterning exposure with UV at an exposure of 2000 J/m². Development was conducted for one minute, by using an aqueous solution containing 2.38% of TMAH (tetramethyl ammonium hydroxide). Baking was conducted at a temperature of 220° C. for 1 hour.

Then 50×50=2500 numbers of openings 132 with the size of 150 μm×150 μm were provided at a pitch of 254 μm (100 pixels per inch), and 2500 simulated pixel electrodes 111m were formed.

(Production of Scattering Layer 133)

After the simulated pixel electrodes 111m were produced, the ink made of titanium dioxide particles dispersed in an aqueous solution containing PVA (polyvinyl alcohol) was printed thereon by a screen printing method. This was dried at a temperature of 80° C. to form a 20 μm-thick scattering layer 133 for displaying white by scattering and reflecting the external light coming through the common electrode. Bead spacers (silica balls having a diameter of 25 μm, not illustrated) were dispersed thereon.

(Structuring of Material-Characteristics Evaluation Panel 10a)

An epoxy resin was printed on the glass substrate 103 forming the common electrode 113 by a screen printing method, whereby a seal pattern 105 was formed. The glass substrate 103 with the seal pattern 105 formed thereon and the drive substrate 101 with the simulated pixel electrodes 111m formed thereon were bonded together with the seal pattern 105.

The electrolytic solution 123 containing the aforementioned silver ion 125 was poured between the glass substrate 103 and the drive substrate 101 by a vacuum pouring method, and the pouring inlet was sealed with a UV curable polymethyl methacrylate (PMMA) resin, whereby a material-characteristics evaluation panel 10a of Example 1 was produced. FIG. 6a illustrates the structure of the material-characteristics evaluation panel 10a manufactured in the aforementioned procedure.

(Material Characteristics Evaluation 1)

In FIG. 6b, a drive waveform Vin for evaluating the material-characteristics evaluation panel 10a alternately applies a white pulse Pw (voltage –Vw, application period 500 ms) to display white and a black pulse Pb (voltage Vb, application period 500 ms) to display black at a cycle of 2 seconds.

First, a power supply PS and an ammeter CM are connected between the full-surface electrode 135 and common electrode 113 of the material-characteristics evaluation panel 10a. Then the aforementioned evaluation drive waveform Vin of Vw=Vb=1.5V was applied. This has confirmed that white and black can be displayed on the material-characteristics evaluation panel 10a.

FIG. 7 shows the waveform of the current value Id per pixel measured while the black pulse Pb was applied, and the resistance value R per pixel of the material-characteristics evaluation panel 10a calculated from the current density Id. However, the current value Id is shown in the form of the current waveform measured by the current meter CM and divided by total pixel number 2500, and the result was converted into the current value per pixel.

As will be apparent from FIG. 7, once the black pulse Pb is applied, the first reaction RA1 occurs (0≤pulse application time Tp≤200 ms), and the second reaction RA2 (240 ms≤Tp) occurs. The resistance inflection point Rip is assumed as the point where resistance value R at the end of the first reaction RA1 starts to exhibit a rapid change.

Reactions are assumed to occur as follows: In the first reaction RA1, the silver ion 125 present on the interface of the common electrode 113 is reduced and is deposited on the common electrode 113. In the second reaction RA2, after the silver ion 125 on the interface of the common electrode 113 has been run out, the silver ion 125 at the center portion of the electrolytic solution 123 is reacted to makes up it.

FIG. 7 shows that, when the drive waveform Vin of Vw=Vb=1.5V is applied to the material-characteristics evaluation panel 10a of the Example 1 produced in the aforementioned manner, the resistance value per pixel will be about 300 kΩ until 200 ms, and about 2200 kΩ at and after 240 ms.

(Material Characteristics Evaluation 2)

The drive waveform Vin of FIG. 6b was applied to the material-characteristics evaluation panel 10a of the first example 1000 times repeatedly, and the withstand voltage was measured. The application voltage of the drive waveform Vin was changed by an increment of 0.1 volt in the range from Vw=Vb=1.6 volts through 2.0 volts. To put it more specifically, in order to determine the withstand voltage, the drive waveform Vin was repeatedly applied 1000 times, and after that, an inspection was performed to see whether gas bubbles were present in the electrolytic solution 123 or not. If the withstand voltage had been exceeded, the electrolytic solution 123 or the water contained therein was expected to be electrolyzed to produce gas bubbles. Table 1 shows the results.

TABLE 1

| Vw = Vb = | Percentage of occurrence of gasbubbles after 1000 driving operations (%) |
|---|---|
| 1.6 V | 0 |
| 1.7 V | 0 |
| 1.8 V | 23 |
| 1.9 V | 78 |
| 2.0 V | 99 |

Table 1 shows that gas bubbles do not occur if the application voltage of the drive waveform Vin is equal to or less than Vw=Vb=1.7V. This shows that the withstand voltage of the material-characteristics evaluation panel 10a of Example 1 produced in the aforementioned manner is 1.7 volts.

(Verification on Display Panel 10)

Figure 8:
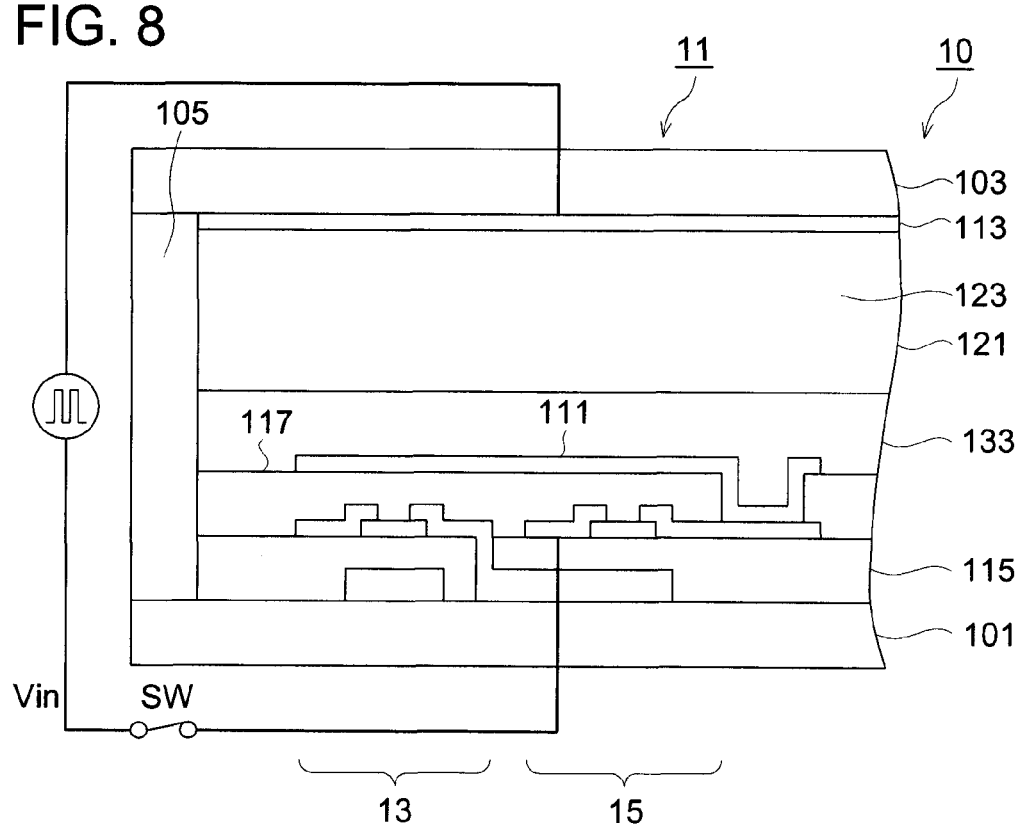
FIG. 8 is a schematic diagram representing a cross section of a display panel in the first example.

The aforementioned electrolytic solution 123 was used to produce a display panel 10 using TFTs as shown in FIG. 1, where the pixel arrangement was the same as that of the material-characteristics evaluation panel 10a. FIG. 8 shows the cross section of the display panel 10 having been produced. The display panel 10 is structured in such a way that TFTs were added to the material-characteristics evaluation panel 10a of FIG. 6a. The pixel electrodes 111 are arranged separately for each pixel. The insulating film 131 for forming simulated pixel electrodes 111m was not formed.

The structure of the TFT is the same as that shown in FIGS. 2a and 2b. The a-Si (amorphous silicon) TFT was used for the selection transistor 13 and the drive transistor 15. The pixel electrode 111 had a size of 150 μm 150 μm, and the pixel pitch was 254 μm. The number of pixels was 50×50=2500. In this case, the channel resistance of the drive transistor 15 was 70 kΩ.

Figure 9A:
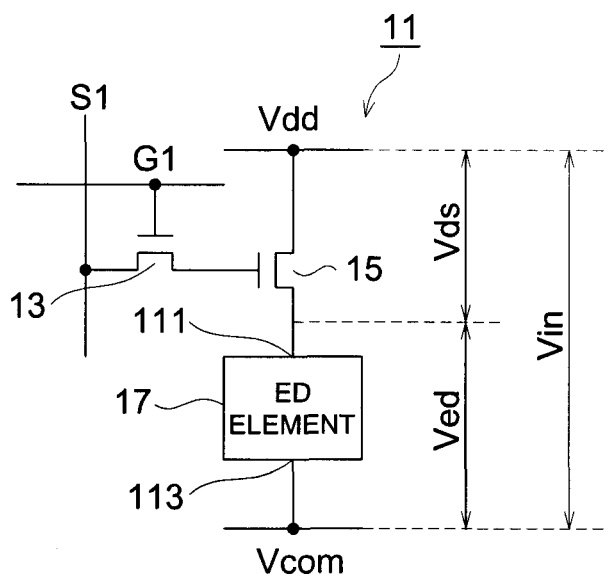
FIGS. 9a and 9b are schematic diagrams representing a pixel circuit configuration and a drive waveform for the display panel of the first example.

FIG. 9a shows the circuit structure of the pixel 11 of the display panel 10 of Example 1. The circuit structure of the pixel 11 of the display panel 10 of Example 1 is the same as that of FIG. 1 and FIG. 2a.

Figure 9B:
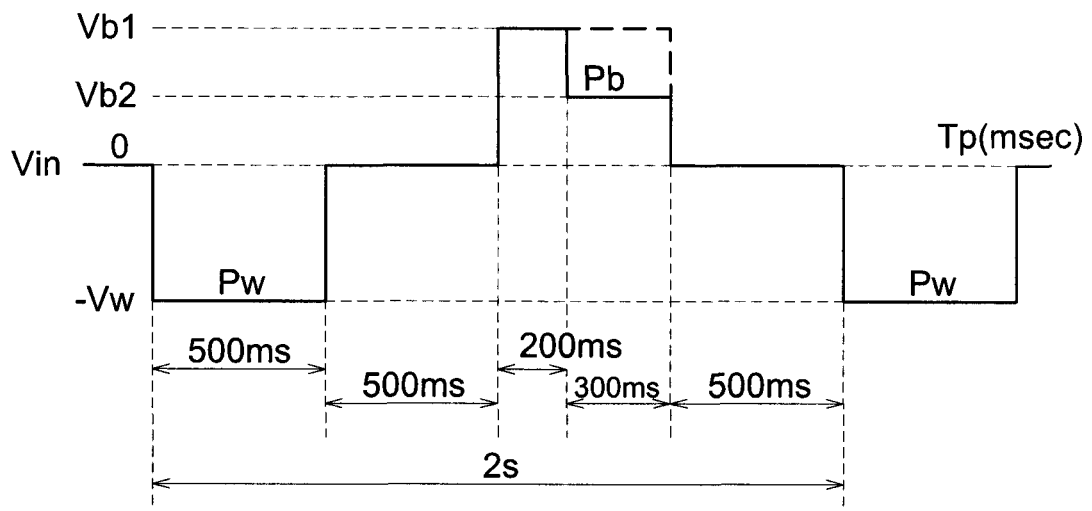

FIG. 9b shows the evaluation drive waveform Vin for the display panel 10. In the drive waveform Vin, a white pulse Pw (voltage −Vw, application time period 500 ms) to display white and a black pulse Pb (voltages Vb1 and Vb2, application time period 500 ms) to display black are alternately applied at a cycle of 2 seconds between the power supply Vdd of the drive transistor 15 and the common potential Vcom of the common electrode 113. The black pulse Pb has a pulse waveform with two steps; namely, the pulse had a voltage of Vb1 for the pulse application time Tp≤200 ms and had a voltage of Vb2 (Vb2<Vb1) for 200 ms<Tp≤500 ms. In this pulse waveform, the rectangular wave of voltage Vb1 and the rectangular wave of voltage Vb2 were continuously applied.

In Example 1, Vw=Vb1=2.0V and Vb2=1V were used. Application of the drive waveform Vin was repeated 1000 times. No gas bubble was observed, and there was no problem. Incidentally, the blackening time for the display to change from white to black was 500 ms, which had been used to determine the application time of the black pulse Pb described above.

Comparative Example 1

In the Example 1, driving operation was performed with Vb1=Vb2=2V, without changing the application voltage of the black pulse Pb. Application of the drive waveform was repeated 1000 times, and gas bubbles were observed in approximately 80 percent of the pixels.

Comparative Example 2

In Example 1, driving operation was performed with Vb1=Vb2=1V, without changing the application voltage of the black pulse Pb. After the operation was performed 1000 times, no gas bubble had been produced. However, the application time 500 ms of the black pulse Pb did not cause the white display to change perfectly into the black display, and the blackening time needed to be 2500 ins, which is approximately five times that in the Example 1. Table 2 shows the results:

TABLE 2

| | Vw | Vb1 | Vb2 | Percentage of gas bubbles occurring after 1000 driving operations (%) | Blackening time |
|---|---|---|---|---|---|
| Example 1 | 2.0 V | 2.0 V | 1.0 V | 0 | 500 ms |
| Comparative Example 1 | 2.0 V | 2.0 V | 2.0 V | 80 | — |
| Comparative Example 2 | 2.0 V | 1.0 V | 1.0 V | 0 | 2500 ms |

The following discusses the results shown above: Table 3 shows the measurements of the voltage Vds between the drain and the source of the drive transistor 15 at the time of application of the black pulse Pb to the pixel 11, and the voltage Ved between the pixel electrode 111 and the common electrode 113 of the ED element 17, in the region of the first reaction RA1 and the region of the second reaction RA2 of FIG. 7, and in Example 1 and Comparative Example 1.

TABLE 3

| Voltage between Vdd and Vcom | Comparative Example 1 (2 V) | | Comparative Example 2 (1 V) | |
|---|---|---|---|---|
| | RA1 | RA2 | RA1 | RA2 |
| Vds | 0.38 V | 0.06 V | 0.19 V | 0.03 V |
| Ved | 1.62 V | 1.94 V | 0.81 V | 0.97 V |

As will be apparent from Table 3, in the region of the second reaction RA2, the voltage Ved between the pixel electrode 111 of the pixel 11 and common electrode 113 exceeds the aforementioned withstand voltage (=1.7V), whereby the element was broken with the air bubble having been produced.

Example 2

The material-characteristics evaluation panel 10a of Example 2 is different from the material-characteristics evaluation panel 10a in Example 1 only in the material of a full-surface electrode 135 described blow. Other than that, it is the same as material-characteristics evaluation panels 10a of Example 1.

(Production of Full-Surface Electrode 135)

A film was formed on an entire surface of the region, for the pixels to be provided, on a drive substrate 101 to get a full-surface electrode 135. The silver paste was 0.8 μm thick.

(Material Characteristics Evaluation 1)

Figure 10:
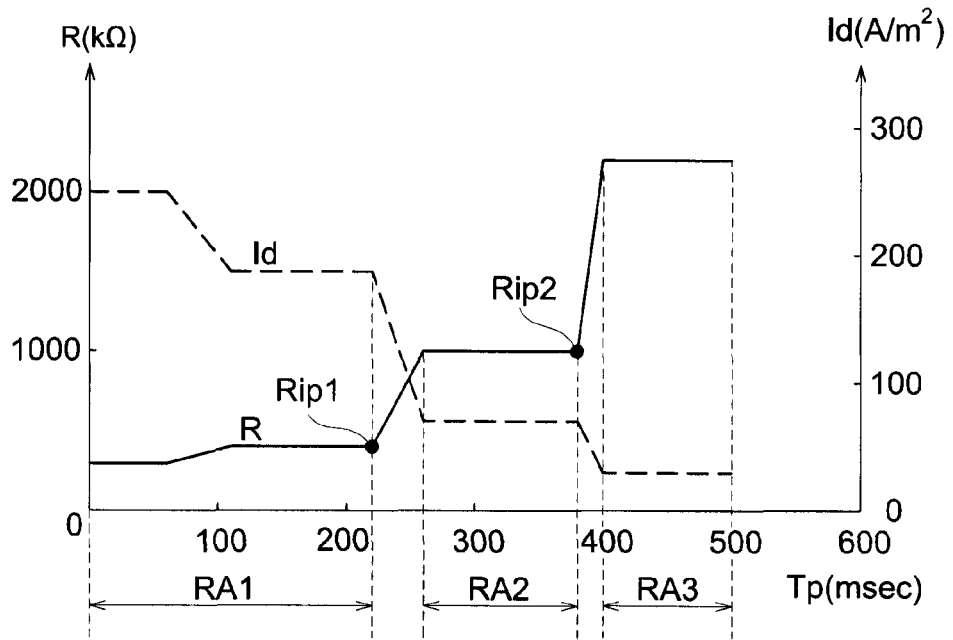
FIG. 10 is a graph showing a current value and resistance value of a pixel in the second example.

Similarly to Example 1, Material characteristics evaluation 1 was conducted. FIG. 10 shows the waveform of the current density Id per pixel measured while the black pulse Pb was applied, and resistance value R per pixel of the material-characteristics evaluation panel 10a calculated from the measured current density Id.

As will be apparent from FIG. 10, when the black pulse Pb was applied, the first reaction RA1 took place (0≤pulse application time Tp≤220 ms) followed by the second reaction RA2 (260 ms TP≤380 ms) and the third reaction RA3 (400 ms≤TP). The point where a great change starts to occur to resistance value R at the termination of the first reaction RA1 is assumed as a first resistance inflection point Rip1. The point where a great change starts to occur to resistance value R at the termination of the second reaction RA2 is assumed as a second resistance inflection point Rip2.

Similarly to Example 1, reactions are assumed to be performed as follows: In the first reaction RA1, the silver ion 125 present on the interface of the common electrode 113 is reduced and is deposited on the common electrode 113. In the second reaction RA2, after the silver ion 125 on the interface of the common electrode 113 has been run out, the silver ion 125 in the center portion of the electrolytic solution 123 makes up for this loss. Further, in the third reaction RA3, the silver ion 125 was dissolved from the silver past, moved to the common electrode 113, and reacted.

(Material Characteristics Evaluation 2)

Material characteristics evaluation 2 was made according to the procedure used in Example 1.

TABLE 4

| $Vw = Vb =$ | Percentage of gas bubbles occurring after 1000 driving operations (%) |
|---|---|
| 1.6 V | 0 |
| 1.7 V | 0 |
| 1.8 V | 21 |
| 1.9 V | 67 |
| 2.0 V | 97 |

Table 4 indicates that if the application voltage of the drive waveform Vin is equal to or less than Vw=Vb=1.7V, gas bubbles do not occur. This shows that the withstand voltage of the material-characteristics evaluation panel 10a produced by the aforementioned procedure is 1.7V, similarly to Example 1.

(Verification on Display Panel 10)

Similarly to Example 1, a display panel 10 using TFTs was produced to verify the characteristics. The black pulse Pb had voltages of Vb1=2V for the pulse application time Tp≤220 ms, and Vb2=1.6V for 220 ms<Tp≤500 ms. The application of the drive waveform Vin was repeated 1000 times, but no gas bubble was observed, and there was no problem. Incidentally, the blackening time for the white to change to black was 500 ms, which had been used to determine the application time of the black pulse Pb described above.

Comparative Example 3

The driving operation of Example 2 was performed with Vb1=Vb2=2V, without changing the application voltage of the black pulse Pb. The operation was repeated 1000 times, and gas bubbles were observed in 25 percent of the pixels.

Comparative Example 4

The driving operation of Example 2 was performed at Vb1=Vb2=1.6V without changing the application voltage of the black pulse Pb. The operation was repeated 1000 times, and no gas bubbles were observed. However, the application time 500 ms of the black pulse Pb did not cause the white display to change perfectly into the black display, and the blackening time needed to be 2000 ms, which was approximately four times that of the Example 2. Table 5 shows the result:

TABLE 5

| | Vw | Vb1 | Vb2 | Percentage of gas bubbles occurring after 1000 driving operations (%) | Blackening time |
|---|---|---|---|---|---|
| Example 2 | 2.0 V | 2.0 V | 1.6 V | 0 | 500 ms |
| Comparative Example 3 | 2.0 V | 2.0 V | 2.0 V | 25 | — |
| Comparative Example 4 | 2.0 V | 1.6 V | 1.6 V | 0 | 2000 ms |

The following discusses the above results. Table 6 shows the measurements of the voltage Vds between the drain and the source of the drive transistor 15 at the time of application of the black pulse Pb to the pixel 11, and the voltage Ved between the pixel electrode 111 of the ED element 17 and the common electrode 113, in the region of the first reaction RA1 of FIG. 10, the region of the second reaction RA2, and the region of the third reaction RA3, in Comparative Examples 3 and 4.

TABLE 6

| Voltage between | Comparative Example 3 (2 V) | | | Comparative Example 4 (1.6 V) | | |
|---|---|---|---|---|---|---|
| Vdd and Vcom | RA1 | RA2 | RA3 | RA1 | RA2 | RA3 |
| Vds | 0.30 V | 0.14 V | 0.08 V | 0.24 V | 0.11 V | 0.07 V |
| Ved | 1.70 V | 1.86 V | 1.92 V | 1.36 V | 1.49 V | 1.53 V |

As will be apparent from Table 6, in the region of the second reaction RA2 and the region of the third reaction RA3 of Comparative Example 3, the voltage Ved between the pixel electrode 111 and common electrode 113 of the pixel 11 exceeds the aforementioned withstand voltage (=1.7V), whereby the element was broken with the air bubble having been produced.

Example 3

The material-characteristics evaluation panel 10a of Example 3 is different from the material-characteristics evaluation panel 10a in Example 2 only in the density of the silver iodide in the electrolytic solution 123. Other than that, it is the same as material-characteristics evaluation panels 10a in Example 2.

(Production of Electrolytic Solution 123)

The amount of silver iodide in the electrolytic solution 123 of Example 2 was change from 75 mg to 150 mg.

(Material Characteristics Evaluation 1)

Figure 11:
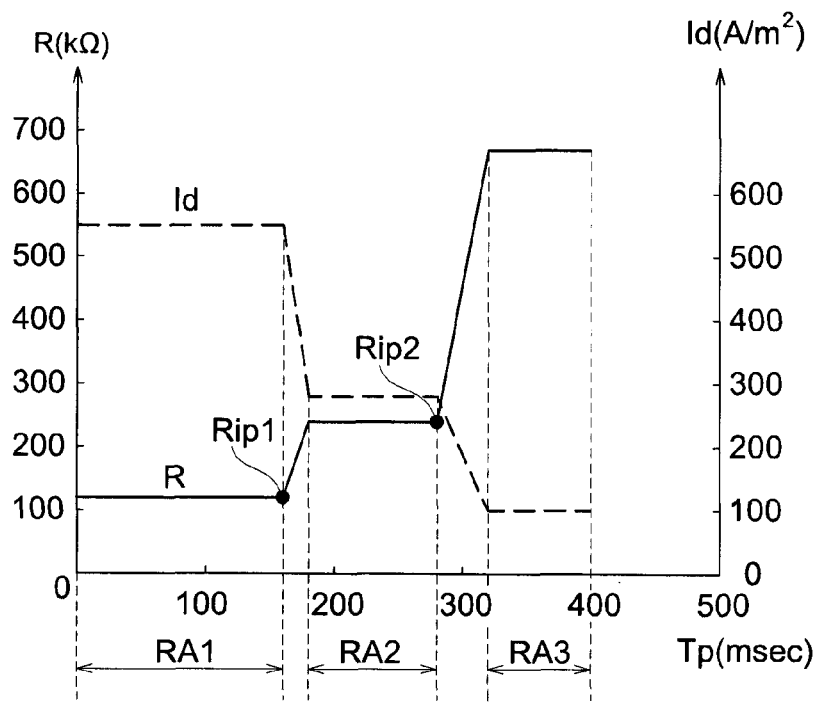
FIG. 11 is a graph showing a current value and resistance value of a pixel in the third example.

Similarly to Example 2, Material characteristics evaluation 1 was conducted. FIG. 11 shows the waveform of the current density Id per pixel measured while the black pulse Pb was applied, and resistance value R per pixel of the material-characteristics evaluation panel 10a calculated from the measure current density Id.

FIG. 11 shows that, similarly to Example 2, the first reaction RA1 (0≤pulse application time Tp≤160 ms), second reaction RA2 (180 ms≤Tp≤280 ms) and third reaction RA3 (320 ms≤Tp) took place in Example 3. The point where a great change starts to occur to resistance value R at the termination of the first reaction RA1 is assumed as a first resistance inflection point Rip1. The point when a great change starts to occur to resistance value R at the termination of the second reaction RA2 is assumed as a second resistance inflection point Rip2.

It can be seen that resistance value R of the material-characteristics evaluation panel 10a has been reduced by doubling the amount of silver iodide in the electrolytic solution 123.

(Material Characteristics Evaluation 2)

Similarly to Example 2, Material characteristics evaluation 2 was conducted. The result is given in Table 7.

TABLE 7

| Vw = Vb = | Percentage of gas bubbles occurring after 1000 driving operations (%) |
|---|---|
| 1.5 V | 0 |
| 1.6 V | 11 |
| 1.7 V | 69 |
| 1.8 V | 96 |
| 1.9 V | 100 |

Table 7 indicates that, if the application voltage of the drive waveform vin is equal to or less than Vw=Vb=1.5V, gas bubbles do not occur. This shows that the withstand voltage of the material-characteristics evaluation panel 10a produced by the aforementioned procedure is 1.5V.

(Verification on Display Panel 10)

Similarly to Example 2, a display panel 10 using the TFT was produced to verify, the characteristics. The black pulse Pb had voltages of Vb1=2V for the pulse application time Tp≤280 ms, and Vb2=1.4V for 280 ms<Tp≤400 ms. The application of the drive waveform Vin was repeated 1000 times, but no gas bubble was observed, and there was no problem. Incidentally, the blackening time for the white to change to black was 400 ms, had been used to determine the application time of the black pulse Pb described above.

Comparative Example 5

The driving operation of Example 3 was performed with Vb1=Vb2=2V without changing the application voltage of the black pulse Pb. The operation was repeated 1000 times, and gas bubbles were observed on approximately 90 percent of the pixels.

Comparative Example 6

The driving operation of Example 3 was performed with Vb1=Vb2=1.4V without changing the application voltage of the black pulse Pb. The operation was repeated 1000 times, and no gas bubbles were observed. However, the application time period 500 of the black pulse Pb did not cause the white display to change perfectly into the black display, and the blackening time needed to be 2000 ms, which was approximately five times that of the Example 3. Table 8 shows the result:

TABLE 8

|  | Vw | Vb1 | Vb2 | Percentage of gas bubbles occurring after 1000 driving operations (%) | Blackening time |
|---|---|---|---|---|---|
| Example 3 | 2.0 V | 2.0 V | 1.4 V | 0 | 400 ms |
| Comparative Example 5 | 2.0 V | 2.0 V | 2.0 V | 90 | — |
| Comparative Example 6 | 2.0 V | 1.4 V | 1.4 V | 0 | 2000 ms |

The following discusses the above results. Table 9 shows the measurements of the voltage Vds between the drain and the source of the drive transistor 15 at the time of application of the black pulse Pb to the pixel 11, and the voltage Ved between the pixel electrode 111 of ED element 17 and the common electrode 113, in the region of the first reaction RA1 of FIG. 11, the region of the second reaction RA2 and the region of the third reaction RA3, in Comparative Example 5 and 6

TABLE 9

| Voltage between | Comparative Example 5 (2 V) | | | Comparative Example 6 (1.4 V) | | |
|---|---|---|---|---|---|---|
| Vdd and Vcom | RA1 | RA2 | RA3 | RA1 | RA2 | RA3 |
| Vds | 0.78 V | 0.47 V | 0.19 V | 0.54 V | 0.33 V | 0.13 V |
| Ved | 1.22 V | 1.53 V | 1.81 V | 0.86 V | 1.07 V | 1.27 V |

As will be apparent from Table 9, in the region of the second reaction RA2 and the region of the third reaction RA3 of Comparative Example 5, the voltage Ved between the pixel electrode 111 and common electrode 113 of the pixel 11 exceeds the aforementioned withstand voltage (=1.5V), whereby the element was broken with the air bubble having been produced.

DESCRIPTION OF REFERENCE NUMERALS

10. Display panel
10a. Material-characteristics evaluation panel
11. Pixel
13. Selection transistor
15. Drive transistor
17. Electrochemical display element (ED element)
21. Data circuit
31. Scanning circuit
101. Drive substrate
103. Common substrate
105. Seal pattern
111. Pixel electrode
111m. Simulated pixel electrodes
113. Common electrode
115. Gate insulation layer
117. Flattening film
121. Electrolytic solution layer
123. Electrolytic solution
125. Silver ion
131. Insulating film
132. Opening (of the insulating film 131)
133. Scattering layer
135. Full-surface electrode
G1, G2, G3. Scanning lines
S1, S2, S3. Data lines

The invention claimed is:

1. A method for driving an electrochemical display element, which uses an electrochemical display element, including: a plurality of pixel electrodes each provided on each of a plurality of pixels arranged in two-dimensional matrix; a common electrode commonly provided on the pixels; and an electrolytic solution layer sandwiched between respective pixel electrodes and the common electrode and containing metal ion, the method comprising:

applying a deposition voltage across the pixel electrodes and the common electrode so as to deposit the metal ion and display an image, wherein the deposition voltage includes a plurality of rectangular waves having different voltages for a plurality of levels of deposition;

wherein when a voltage of a rectangular wave, from among the plurality of rectangular waves, having the highest voltage is continuously applied, a resistance value of the pixel reaches an inflexion point of resistance at which point the resistance of the pixel starts to rapidly increase, and then the pixel breaks down; and setting a time period for applying the rectangular wave having the highest voltage to a value equal to or less than a time period to get to the inflexion point when the voltage of the rectangular wave having the highest voltage is continuously applied.

2. The method for driving the electrochemical display element of claim 1, wherein multiple tone display is performed by selectively applying the plurality of rectangular waves for a plurality of times.

3. The method for driving the electrochemical display element of claim 1, wherein the plurality of rectangular waves continuously include a high voltage rectangular wave and a low voltage rectangular wave.

4. The method for driving the electrochemical display element of claim 1, wherein the electrochemical display element includes a pixel circuit configured to apply the deposition voltage between the plurality of pixel electrodes and the common electrode, and the plurality of rectangular waves are generated by changing a resistance of the pixel circuit.

5. The method for driving the electrochemical display element of claim 4, wherein the pixel circuit includes a driving transistor, and the plurality of rectangular waves are generated by changing a channel resistance between a drain and a source of the driving transistor.

6. A method for driving an electrochemical display element including a plurality of pixels two-dimensionally arranged in a matrix to display an image on the electrochemical display element, wherein each of the pixels has: a pixel electrode; a common electrode commonly provided on the plurality of the pixels; and an electrolytic solution layer which is sandwiched between the pixel electrode and the common electrode and contains metal ion therein, wherein a deposition voltage is applied between the pixel electrode and the common electrode to deposit the metal ion in the electrolytic solution layer to display an image, the method comprising:

(a) selectively applying a first writing voltage as the deposition voltage between the pixel electrode and the common electrode of at least part of the pixels for a first application period, wherein the first writing voltage is determined such that when the first writing voltage is continuously applied for more than the first application period, a resistance of the pixel reaches a resistance inflexion point at which the resistance of the each of the pixels starts to increase rapidly, and the pixel then breaks down; and (b) selectively applying a second writing voltage lower than the first writing voltage as the deposition voltage between the pixel electrode and the common electrode of the at least part of the pixels for a second application period.

7. The method of claim 6, wherein in at least one of the step (a) and the step (b), the first writing voltage or the second writing voltage is selectively applied a plurality of times.

8. The method of claim 6, wherein the step (a) and the step (b) are continuously performed, and the deposition voltage continuously includes a rectangular wave of the first writing voltage and a rectangular wave of the second writing voltage.

9. The method of claim 6, wherein each of the pixels includes a pixel circuit configured to apply the deposition voltage between the pixel electrode and the common electrode, and the method further comprising:

(c) generating the first writing voltage and the second writing voltage by changing a resistance of the pixel circuit.

10. The method of claim 9, wherein the pixel circuit includes a driving transistor, and the method further comprising:

(d) generating the first writing voltage and the second writing voltage by changing a channel resistance between a drain and a source of the driving transistor.

* * * * *